(12) United States Patent
Fujii et al.

(10) Patent No.: US 10,122,016 B2
(45) Date of Patent: Nov. 6, 2018

(54) NICKEL-MANGANESE COMPOSITE OXYHYDROXIDE, ITS PRODUCTION METHOD, AND ITS APPLICATION

(71) Applicant: TOSOH CORPORATION, Yamaguchi (JP)

(72) Inventors: Yasuhiro Fujii, Yamaguchi (JP); Nozomi Ide, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 226 days.

(21) Appl. No.: 14/904,548

(22) PCT Filed: Jul. 18, 2014

(86) PCT No.: PCT/JP2014/069238
§ 371 (c)(1),
(2) Date: Jan. 12, 2016

(87) PCT Pub. No.: WO2015/008863
PCT Pub. Date: Jan. 22, 2015

(65) Prior Publication Data
US 2016/0156033 A1    Jun. 2, 2016

(30) Foreign Application Priority Data

Jul. 18, 2013 (JP) ................................. 2013-149435
Dec. 2, 2013 (JP) ................................. 2013-249314

(51) Int. Cl.
*H01M 4/505* (2010.01)
*H01M 4/525* (2010.01)
(Continued)

(52) U.S. Cl.
CPC ............ *H01M 4/525* (2013.01); *C01G 53/00* (2013.01); *C01G 53/006* (2013.01); *C01G 53/58* (2013.01);
(Continued)

(58) Field of Classification Search
CPC .. H01M 4/505; H01M 4/525; H01M 10/0525; C01G 53/00; C01G 53/006; C01G 53/58
(Continued)

(56) References Cited

U.S. PATENT DOCUMENTS 6,254,847 B1    7/2001    Kurisu et al.
2006/0083989 A1    4/2006    Suhara et al.
(Continued)

FOREIGN PATENT DOCUMENTS

CN        1626447        6/2005
CN        101127398 A    *    2/2008
(Continued)

OTHER PUBLICATIONS

International Search Report issued in PCT/JP2014/069238, dated Oct. 21, 2014.
(Continued)

*Primary Examiner* — Sean P Cullen
(74) *Attorney, Agent, or Firm* — Greenblum & Bernstein, P.L.C.

(57) ABSTRACT

A nickel-manganese composite oxyhydroxide which is stable in the air, in which manganese oxide ($Mn_3O_4$) will not form as a by-product during long term storage or at the time of drying, and which has high metal element dispersibility, its production method, and its use. A nickel-manganese composite oxyhydroxide having a chemical compositional formula represented by $Ni_{(0.25+\alpha)-x}M1_xMn_{(0.75-\alpha)-y}M2_yOOH$ (wherein each of M1 and M2 which are independent of each other, is at least one member selected from the group consisting of Mg, Al, Ti, V, Cr, Fe, Co, Cu, Zn and Zr, $0 \leq x \leq 0.1$, $0 \leq y \leq 0.25$, and $-0.025 \leq \alpha \leq 0.025$), and having a hexagonal cadmium hydroxide type crystal structure, its production method and its use.

7 Claims, 16 Drawing Sheets

(51) Int. Cl.
*H01M 10/0525* (2010.01)
*C01G 53/04* (2006.01)
*C01G 53/00* (2006.01)
*H01M 10/052* (2010.01)

(52) U.S. Cl.
CPC ....... *H01M 4/505* (2013.01); *H01M 10/0525* (2013.01); *C01P 2002/32* (2013.01); *C01P 2002/50* (2013.01); *C01P 2002/72* (2013.01); *C01P 2004/03* (2013.01); *C01P 2004/61* (2013.01); *C01P 2006/11* (2013.01); *C01P 2006/12* (2013.01); *C01P 2006/40* (2013.01); *H01M 10/052* (2013.01)

(58) Field of Classification Search
USPC ........................................ 429/223; 252/182.1
See application file for complete search history.

(56) References Cited

U.S. PATENT DOCUMENTS

| | | | |
|---|---|---|---|
| 2008/0241053 | A1 | 10/2008 | Suhara et al. |
| 2009/0200508 | A1 | 8/2009 | Nagase et al. |
| 2009/0302267 | A1 | 12/2009 | Albrecht et al. |
| 2011/0180748 | A1* | 7/2011 | Jahn ................... C01G 53/006 252/182.1 |
| 2012/0305861 | A1 | 12/2012 | Albrecht |
| 2014/0356712 | A1* | 12/2014 | Song ................... H01M 4/131 429/219 |

FOREIGN PATENT DOCUMENTS

| | | | |
|---|---|---|---|
| JP | 2005-194106 | 7/2005 | |
| JP | 2007-70205 | 3/2007 | |
| JP | 2008-266136 | 11/2008 | |
| JP | 2009-515799 | 4/2009 | |
| JP | 2011-153067 | 8/2011 | |
| WO | WO-2013048047 A2 * | 4/2013 | ............ H01M 4/131 |
| WO | 2014/098238 | 6/2014 | |

OTHER PUBLICATIONS

Liu et al., "Solid solution of nickel oxide and manganese oxide as negative active material for lithium secondary cells"; Journal of Power Sources; vol. 146, Jun. 16, 2005; pp. 510-515.

Chinese Office Action issued in Counterpart Patent Application No. 201480040835.8, dated Sep. 26, 2016, along with an English translation thereof.

Extended European Search Report issued in Patent Application No. 14826634.9, dated Nov. 24, 2016.

"Coprecipitation Synthesis of $Ni_xMn_{1-x}(OH)_2$ Mixed Hydroxides", Chem. Mater, 2010, pp. 1015-1021, No. 22.

* cited by examiner

NICKEL-MANGANESE COMPOSITE OXYHYDROXIDE, ITS PRODUCTION METHOD, AND ITS APPLICATION

TECHNICAL FIELD

The present invention relates to a nickel-manganese composite oxyhydroxide, its production method, and its application. Particularly, it relates to a nickel-manganese composite oxyhydroxide, its production method, a lithium-nickel-manganese composite oxide obtained by using the composite oxyhydroxide, and a lithium secondary battery using the composite oxide as a cathode.

BACKGROUND ART

A spinet structure lithium-nickel-manganese composite oxide attracts attention as a cathode active material for a 5 V class lithium secondary battery.

A lithium-nickel-manganese composite oxide has a superlattice structure in which nickel and manganese are regularly aligned.

As a method for producing a lithium-nickel-manganese composite oxide, a solid phase reaction method of mixing a nickel source and a manganese source and firing the mixture, or a production method using a composite hydroxide or composite oxyhydroxide containing nickel and manganese as a precursor may be mentioned. A composite hydroxide or composite oxyhydroxide containing nickel or manganese, in which metals are more uniformly distributed, is considered as a preferred precursor assuming regular alignment of nickel and manganese.

For example, as a precursor of the lithium-nickel-manganese composite oxide, a nickel-manganese composite hydroxide obtained by a coprecipitation method under an inert atmosphere has been disclosed (Patent Document 1 and Non-Patent Document 1).

PRIOR ART DOCUMENTS

Patent Document

Patent Document 1: JP-A-2011-153067

Non-Patent Document

Non-Patent Document 1: F. Zhou et al., Chem. Mater. 2010, 22, 1015-1021

DISCLOSURE OF INVENTION

Technical Problem

In Patent Document 1, a problem is pointed out such that when a nickel-manganese-iron based composite metal hydroxide is stored for a long term as a wet cake prepared by solid-liquid separation from a coprecipitation slurry, manganese oxide ($Mn_3O_4$) forms as a by-product. Further, a problem is pointed out such that if a composite metal hydroxide containing $Mn_3O_4$ as a by-product and a lithium compound are mixed and fired, the formed product lithium composite metal oxide has a non-uniform composition, and performance of a battery using such a lithium composite metal oxide is insufficient.

Further, Non-Patent Document 1 discloses that manganese oxide ($Mn_3O_4$) forms as a by-product when a wet cake of the nickel-manganese composite hydroxide $Ni_xMn_{1-x}(OH)_2$ wherein $x \leq 1/3$ is dried.

As mentioned above, a nickel-manganese composite hydroxide having a relatively high manganese content is unstable in the air, and in such a composite hydroxide, the Mn component segregates even though it is a coprecipitate.

The object of the present invention is to provide a nickel-manganese composite oxyhydroxide which is a composite compound of nickel and manganese, which is stable in the air and in which the manganese component will not segregate in e.g. coprecipitating, washing and drying steps.

Further, another object of the present invention is to provide a lithium-nickel-manganese composite oxide using the nickel-manganese composite oxyhydroxide and to provide a lithium secondary battery using the lithium-nickel-manganese composite oxide as a cathode.

Solution to Problem

The present inventors have conducted extensive studies on a precursor of a lithium-nickel-manganese composite oxide. As a result, they have found that an oxyhydroxide having a specific structure analogous to the structure of a hydroxide is stable in the air even when it has a relatively high Mn chemical composition, and when it is stored for a long time or when it is dried, manganese oxide ($Mn_3O_4$) will not form as a by-product, and further, the Mn component will not segregate in it, and it has high metal element dispersibility. The present inventors have found that a lithium secondary battery using as a cathode a lithium-nickel-manganese composite oxide obtained from the nickel-manganese composite oxyhydroxide as a precursor has a low 4 V potential plateau and has high performance particularly in the energy density, and accomplished the present invention.

That is, the present invention provides the following.

(1) A nickel-manganese composite oxyhydroxide having a chemical compositional formula represented by $Ni_{(0.25+\alpha)-x}M1_xMn_{(0.75-\alpha)-y}M2_yOOH$ (wherein each of M1 and M2 which are independent of each other, is at least one member selected from the group consisting of Mg, Al, Ti, V, Cr, Fe, Co, Cu, Zn and Zr, $0 \leq x \leq 0.1$, $0 \leq y \leq 0.25$, and $-0.025 \leq \alpha \leq 0.025$), and having a hexagonal cadmium hydroxide type crystal structure.

(2) The nickel-manganese composite oxyhydroxide according to the above (1), wherein $\alpha$ is 0.

(3) The nickel-manganese composite oxyhydroxide according to the above (1) or (2), wherein the average valence of Ni, Mn, M1 and M2 is from 2.8 to 3.1.

(4) The nickel-manganese composite oxyhydroxide according to any one of the above (1) to (3), which has an average particle size of from 5 to 20 μm.

(5) A method for producing the nickel-manganese composite oxyhydroxide as defined in any one of the above (1) to (4), which comprises mixing the following aqueous metal salt solution, an aqueous caustic soda solution and the following oxidizing agent at a pH of from 8.5 to 10 to obtain a mixed aqueous solution and precipitating the nickel-manganese composite oxyhydroxide in the mixed aqueous solution:

aqueous metal salt solution: an aqueous metal salt solution containing nickel and manganese or an aqueous metal salt solution containing nickel and manganese and further containing at least one member selected from the group consisting of Mg, Al, Ti, V, Cr, Fe, Co, Cu, Zn and Zr;

oxidizing agent: an oxygen-containing gas or an aqueous hydrogen peroxide solution.

(6) The production method according to the above (5), wherein a complexing agent is further added.
(7) The production method according to the above (6), wherein the complexing agent is ammonia, an ammonium salt or an amino acid.
(8) A lithium-nickel-manganese composite oxide, which is obtained by mixing the nickel-manganese composite oxyhydroxide as defined in any one of the above (1) to (4) with a lithium compound and subjecting the mixture to heat treatment.
(9) A lithium secondary battery, which uses the lithium-nickel-manganese composite oxide as defined in the above (8) as a cathode active material.

Advantageous Effects of Invention

The nickel-manganese composite oxyhydroxide of the present invention is stable in the air, manganese oxide ($Mn_3O_4$) will not form as a by-product when it is stored for a long time or when it is dried, and further, the Mn component will not segregate in it, it has high metal element dispersibility, and it is useful as a precursor of a lithium-nickel-manganese composite oxide used as a cathode of a lithium secondary battery.

DESCRIPTION OF EMBODIMENTS

Figure 1:
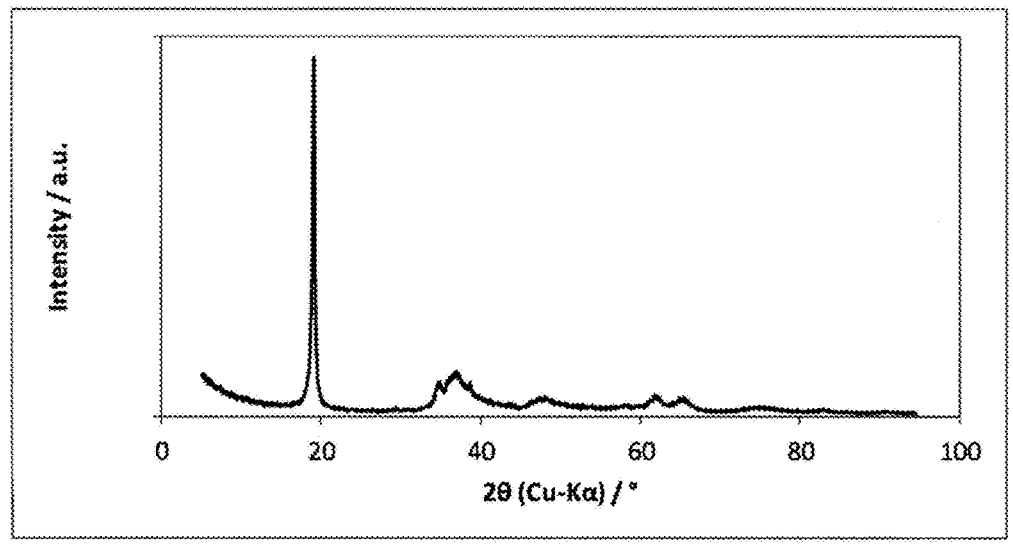
FIG. 1 is an XRD pattern of the nickel-manganese composite oxyhydroxide in Example 1.
Figure 2:
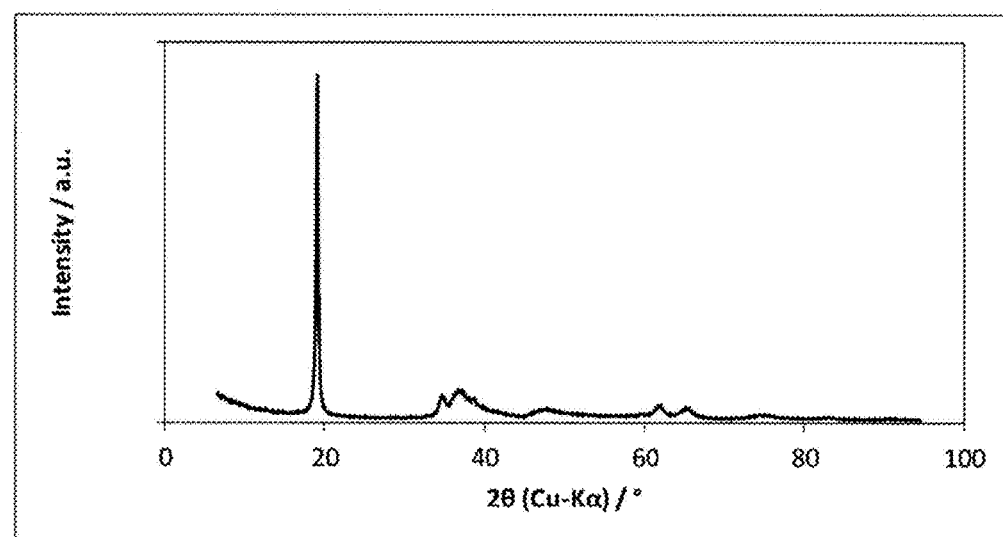
FIG. 2 is an XRD pattern of the nickel-manganese composite oxyhydroxide in Example 2.
Figure 3:
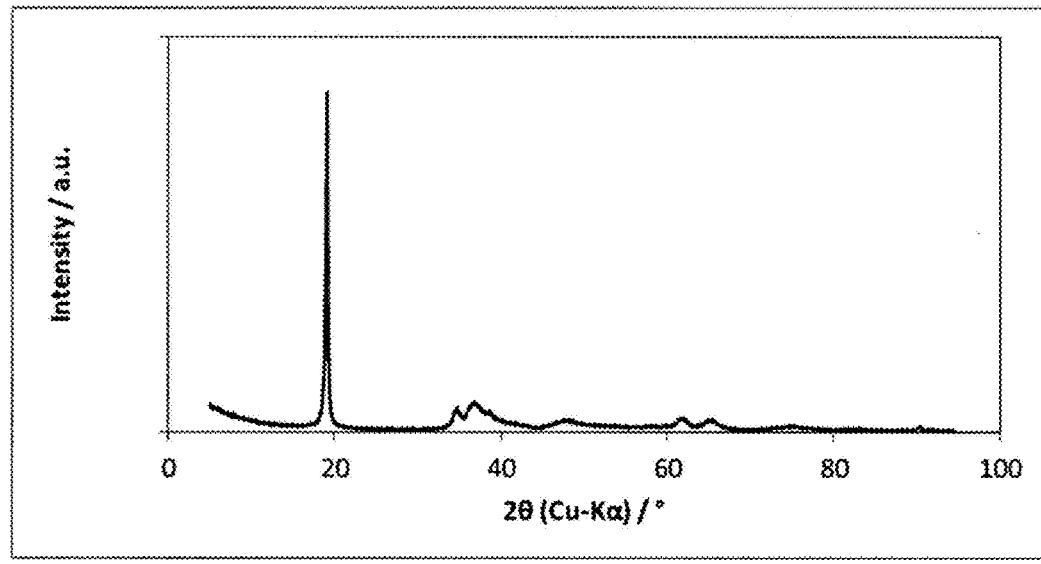
FIG. 3 is an XRD pattern of the nickel-manganese composite oxyhydroxide in Example 3.
Figure 4:
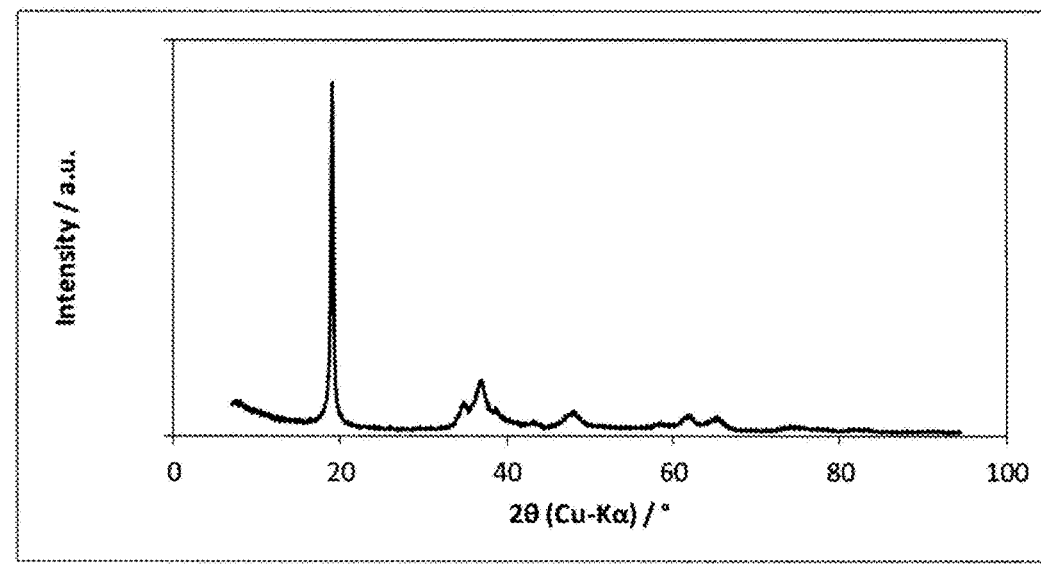
FIG. 4 is an XRD pattern of the nickel-manganese composite oxyhydroxide in Example 4.
Figure 5:
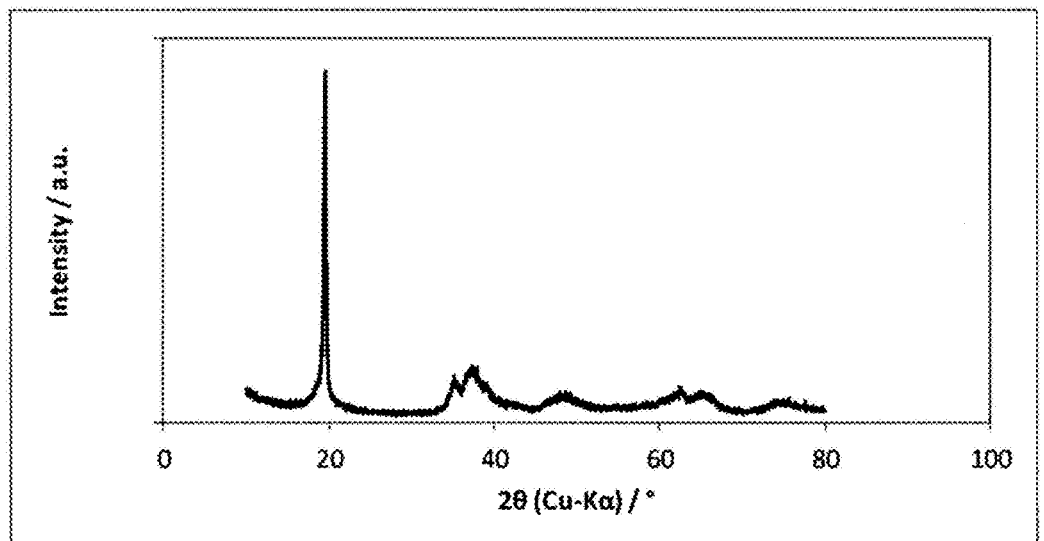
FIG. 5 is an XRD pattern of the nickel-manganese composite oxyhydroxide in Example 5.
Figure 6:
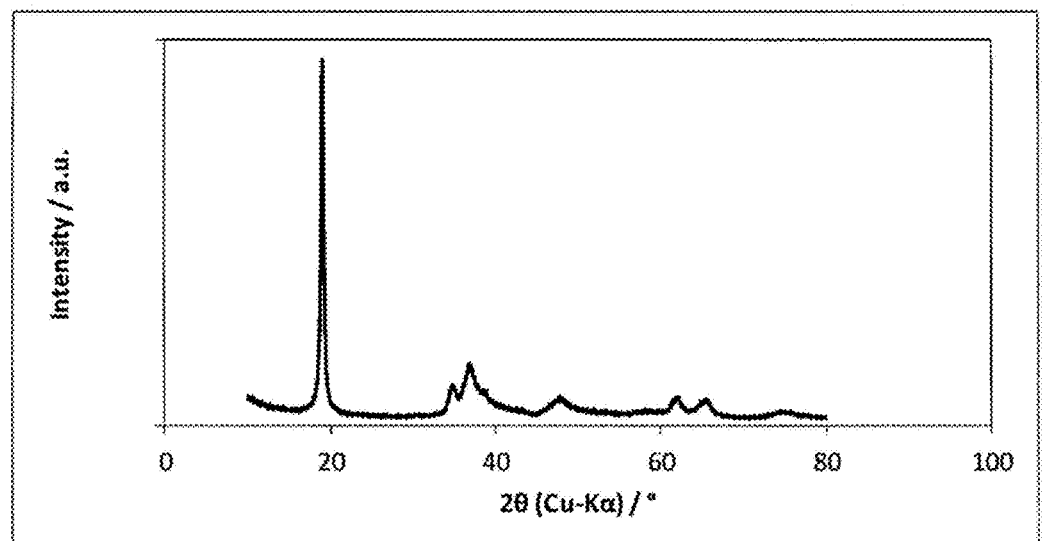
FIG. 6 is an XRD pattern of the nickel-manganese composite oxyhydroxide in Example 6.

The nickel-manganese composite oxyhydroxide of the present invention has a chemical compositional formula represented by $Ni_{(0.25+\alpha)-x}M1_xMn_{(0.75-\alpha)-y}M2_yOOH$ (wherein each of M1 and M2 which are independent of each other, is at least one member selected from the group consisting of Mg, Al, Ti, V, Cr, Fe, Co, Cu, Zn and Zr, $0 \leq x \leq 0.1$, $0 \leq y \leq 0.25$, and $-0.025 \leq \alpha \leq 0.025$).

In the above chemical compositional formula, Ni+M1=0.25±0.025 and Mn+M2=0.75±0.025, and if they are out of such ranges, the chemical compositional formula deviates from formal valences of $Ni^{2+}$ and $Mn^{4+}$, and the battery capacity in the vicinity of 5 V (Li metal anode basis) decreases. Particularly, Ni+M1 is preferably 0.25±0.01, and Mn+M2 is preferably 0.75±0.01.

Further, in the above chemical compositional formula, α is $-0.025 \leq \alpha \leq 0.025$, and if α is within such a range, the chemical compositional formula deviates from formal valences of $Ni^{2+}$ and $Mn^{4+}$, and the battery capacity in the vicinity of 5 V (Li metal anode basis) decreases. α is preferably 0 (Ni:Mn=0.25:0.75 (molar ratio)).

The nickel-manganese composite oxyhydroxide of the present invention exhibits sufficient effects even if there is no dissimilar metal (x=0 and y=0), however, by substitution with dissimilar metals (M1, M2), improvement in the battery performance particularly in the stability of the charge and discharge cycle and an effect to suppress elution of Mn can be expected. However, if the amount of the dissimilar metals is too large, the degree of order of Ni—Mn ordered alignment in the spinel sublattice decreases, and the battery capacity in the vicinity of 5 V (Li metal anode basis) decreases. Accordingly, it is preferred that $0 \leq x \leq 0.1$ and $0 \leq y \leq 0.25$, and it is more preferred that $0 \leq x \leq 0.05$ or $0 \leq y \leq 0.1$.

The amount of substitution with dissimilar metal relative to Ni is preferably small so as to maintain the degree of order of Ni—Mn ordered alignment in the spinel sublattice and the battery capacity in the vicinity of 5 V (Li metal anode basis).

As a preferred specific chemical composition of the nickel-manganese composite oxyhydroxide of the present invention, $Ni_{0.25}Mn_{0.75}OOH$, $Ni_{0.25}Mn_{0.65}Ti_{0.10}OOH$, $Ni_{0.20}Fe_{0.05}Mn_{0.75}OOH$, $Ni_{0.23}Mg_{0.02}Mn_{0.75}OOH$, $Ni_{0.225}Mg_{0.025}Mn_{0.75}OOH$, $Ni_{0.225}Co_{0.05}Mn_{0.725}OOH$ ($Ni_{0.225}Co_{0.025}Mn_{0.725}Co_{0.025}OOH$), or $Ni_{0.23}Zn_{0.02}Mn_{0.75}OOH$ may, for example, be mentioned. Among them, $Ni_{0.25}Mn_{0.75}OOH$ is preferred.

The nickel-manganese composite oxyhydroxide of the present invention is an oxyhydroxide having a hexagonal cadmium hydroxide type crystal structure. Whereas, for example, an a nickel hydroxide type structure is likely to include anions which may be impurities such as $SO_4$, since the space between transition metal layers is relatively wide. A cadmium hydroxide type crystal structure is preferred since anions will not be included in between the transition metal layers.

The cadmium hydroxide type structure is a crystal structure in which hydroxide ions are disposed to positions of iodine ions in a hexagonal cadmium iodide type structure, and hydroxide ions are disposed in a substantial hexagonal closest packing structure, and metal ions are positioned in gaps of octahedral six-coordinate in every other layer in the c-axis direction.

In the crystal structure of the nickel-manganese composite oxyhydroxide of the present invention, metal ions such as nickel, manganese, M1 and M2 are positioned instead of cadmium ions in the cadmium hydroxide type structure.

The tap density of the nickel-manganese composite oxyhydroxide of the present invention is preferably at least 1.0 g/cm$^3$, more preferably at least 1.5 g/cm$^3$, particularly preferably at least 2.0 g/cm$^3$, since the packing efficiency of the cathode active material in the electrode influences the energy density. It is most preferably from 1.7 to 2.2 g/cm$^3$.

When the tap density is at least 1.0 g/cm$^3$, the packing efficiency of the lithium-nickel-manganese composite oxide obtained from the nickel-manganese composite oxyhydroxide of the present invention as a material tends to be high.

The nickel-manganese composite oxyhydroxide of the present invention has a theoretical average valence of trivalent, and the average valence of Ni, Mn, M1 and M2 in the chemical compositional formula is preferably from 2.8 to 3.1, more preferably from 2.9 to 3.0. Here, the average valence is determined by iodometry. The theoretical average valency is in accordance with the formal oxidation number.

The specific surface area of the nickel-manganese composite oxyhydroxide of the present invention is not particularly limited, and is preferably at most 70 m$^2$/g, whereby a high packing efficiency tends to be obtained, more preferably at most 50 m$^2$/g, particularly preferably at most 35 m$^2$/g, most preferably at most 10 m$^2$/g. Particularly, it is very preferably from 5 to 35 m$^2$/g.

In general, the packing efficiency and the specific surface area correlate with each other, and a powder with a high packing efficiency tends to be obtained when the specific surface area is lower.

The average particle size of the nickel-manganese composite oxyhydroxide of the present invention is preferably from 5 to 20 μm, more preferably from 5 to 10 μm, whereby the electrode is easily formed. Further, the average particle size is an average particle size of secondary particles having primary particles agglomerated, i.e. the so-called agglomerated particle size.

The particle size distribution of the nickel-manganese composite oxyhydroxide of the present invention is not particularly limited, and may, for example, be monodispersed particle size distribution or bimodal particle size distribution. In the case of a monodispersed i.e. monomodal particle size distribution, a resulting cathode has a uniform particle size and thus a more uniform charge and discharge reaction will be achieved.

The nickel-manganese composite oxyhydroxide of the present invention has a chemical compositional formula represented by $Ni_{(0.25+\alpha)-x}M1_xMn_{(0.75-\alpha)-y}M2_yOOH$ (wherein each of M1 and M2 which are independent of each other, is at least one member selected from the group consisting of Mg, Al, Ti, V, Cr, Fe, Co, Cu, Zn and Zr, $0 \leq x \leq 0.1$, $0 \leq y \leq 0.25$, and $-0.025 \leq \alpha \leq 0.025$).

The nickel-manganese composite oxyhydroxide of the present invention may contain, for example, an alkali metal such as Mg, Ca, Na or K or an alkaline earth metal in addition to the elements contained in the chemical compositional formula within a range not to impair the effects. The amount of such metals such as Mg is preferably as small as possible, however, if such components are contained in an appropriate amount, an effect of improving the cycle performance is obtained in some cases. However, if the content of such metals exceeds 1,000 ppm, problems arise such that the 4 V potential plateau capacity increases and the energy density is impaired. Accordingly, their content is preferably at most 1,000 ppm, more preferably from 20 to 1,000 ppm, further preferably from 200 to 1,000 ppm, particularly preferably from 300 to 600 ppm.

Now, the method for producing the nickel-manganese composite oxyhydroxide of the present invention will be described.

The nickel-manganese composite oxyhydroxide of the present invention is produced by mixing an aqueous metal salt solution containing nickel and manganese, or nickel, manganese and at least one member selected from the group consisting of Mg, Al, Ti, V, Cr, Fe, Co, Cu, Zn and Zr, an aqueous caustic soda solution and an oxygen-containing gas or an aqueous hydrogen peroxide solution as an oxidizing agent at a pH of from 8.5 to 10 to obtain a mixed aqueous solution and precipitating the nickel-manganese composite oxyhydroxide in the mixed aqueous solution to obtain a slurry.

The aqueous metal salt solution contains at least nickel and manganese and may contain at least one member selected from the group consisting of Mg, Al, Ti, V, Cr, Fe, Co, Cu, Zn and Zr.

The aqueous metal salt solution may, for example, be an aqueous solution having a sulfate, a chloride, a nitrate, an acetate or the like containing nickel and manganese and further containing another predetermined metal dissolved therein, or an aqueous solution having nickel and manganese and further another predetermined metal dissolved in an inorganic acid such as sulfuric acid, hydrochloric acid or nitric acid or an organic acid such as acetic acid. As a preferred aqueous metal salt solution, an aqueous solution containing nickel sulfate and manganese sulfate may be mentioned.

Further, the proportion of nickel, manganese and another predetermined metal in the aqueous metal salt solution is set to achieve the desired proportion of nickel, manganese and another predetermined metal in the nickel-manganese composite oxyhydroxide to be obtained.

The proportion of nickel, manganese and another predetermined metal in the aqueous metal salt solution may be, by molar ratio, $Ni+M1:Mn+M2=0.25+\alpha:0.75-\alpha$, $Ni:M1=(0.25+\alpha)-x:x$, $Mn:M2=(0.75-\alpha)-y:y$ (each of M1 and M2 which are independent of each other, is at least one member selected from Mg, Al, Ti, V, Cr, Fe, Co, Cu, Zn and Zr, $0 \leq x \leq 0.1$, $0 \leq y \leq 0.25$, and $-0.025 \leq \alpha \leq 0.025$). The predetermined ranges and the like of $\alpha$, x and y are as mentioned above.

The total concentration (metal concentration) of all the metals such as nickel and manganese in the aqueous metal salt solution is optional, however, since the metal concentration influences the productivity, it is preferably at least 1.0 mol/L, more preferably at least 2.0 mol/L.

The aqueous caustic soda solution is an aqueous sodium hydroxide solution, and it may, for example, be an aqueous solution having solid sodium hydroxide dissolved in water or an aqueous sodium hydroxide solution formed by salt electrolysis, having its concentration adjusted with water.

The concentration of the aqueous caustic soda solution is preferably from 10 to 48 wt %, more preferably from 15 to 25 wt %.

The oxidizing agent is an oxygen-containing gas or an aqueous hydrogen peroxide solution. In a case where the oxidizing agent is not an oxygen-containing gas or an aqueous hydrogen peroxide solution, for example, in a case where sodium persulfate or sodium chlorate is used, no desired oxyhydroxide will be obtained. The oxygen-containing gas may, for example, be air or oxygen. Air is most preferred in view of economical efficiency. A gas such as air or oxygen is added by bubbling with e.g. a bubbler. Whereas, the aqueous hydrogen peroxide solution may be mixed with the aqueous metal salt solution and the aqueous caustic soda solution. The concentration of the aqueous hydrogen peroxide solution may be from 3 to 30 wt %, preferably from 3 to 10 wt %.

By mixing the aqueous metal salt solution, the aqueous caustic soda solution and the oxygen-containing gas or the aqueous hydrogen peroxide solution as the oxidizing agent at a pH of from 8.5 to 10, a mixed aqueous solution is obtained. The nickel-manganese composite oxyhydroxide of the present invention is precipitated in the mixed aqueous solution and is obtained as a slurry. If the pH exceeds 10, the obtained nickel-manganese composite oxyhydroxide will have a crystal phase other than the cadmium hydroxide type structure and tends to be in the form of fine particles. Such fine particles have low filtration/washing efficiency, thus remarkably lowering the production efficiency. On the other hand, if the pH is less than 8.5, the crystal phase will not be the cadmium hydroxide type structure but will be a mixed phase of an oxyhydroxide and a spinel oxide, and the desired nickel-manganese composite oxyhydroxide is less likely to be precipitated. The pH is preferably from 9 to 10 so as to produce the desired product with a high production efficiency.

The temperature at which the aqueous metal salt solution, the aqueous caustic soda solution and the oxidizing agent are mixed is not particularly limited, however, in order that the oxidizing reaction of the aqueous metal salt solution is likely to proceed and the nickel-manganese composite oxyhydroxide is more likely to be precipitated, it is preferably at least 50° C., more preferably at least 60° C., particularly preferably from 60 to 70° C.

The temperature at the time of mixing may be at least 80° C. depending upon the after-mentioned complexing agent used, however, it is preferably the above-mentioned low temperature in view of the production process.

The pH may vary by mixing of the aqueous metal salt solution, the aqueous caustic soda solution and the oxidizing agent in some cases. In such a case, the pH may be adjusted by properly mixing an aqueous alkali solution other than the aqueous caustic soda solution with the mixed aqueous solution. Mixing of the aqueous alkali solution other than the aqueous caustic soda solution may be carried out continuously or may be carried out intermittently. The aqueous alkali solution other than the aqueous caustic soda solution may, for example, be an aqueous solution of an alkali metal such as potassium hydroxide or lithium hydroxide. Further, the alkali concentration in the aqueous alkali solution may be at least 1 mol/L, and is preferably from 1 to 10 mol/L.

In production of the nickel-manganese composite oxyhydroxide of the present invention, a complexing agent may be added. When a complexing agent coexists, the solubility of nickel ions will increase, the particle surface tends to be smooth, and the sphericity will improve. As a result, the tap density will improve, such being advantageous.

The complexing agent is suitably ammonia, an ammonium salt or an amino acid.

The ammonia may, for example, be an aqueous ammonia solution.

The ammonium salt may, for example, be ammonium sulfate, ammonium chloride, ammonium nitrate or ammonium carbonate, and is particularly preferably ammonium sulfate.

The amino acid may, for example, be glycine, alanine, asparagine, glutamine or lysine, and is particularly preferably glycine.

The complexing agent is preferably fed together with the aqueous metal salt solution. The concentration is, in the case of ammonia or the ammonium salt, preferably from 0.1 to 2, more preferably from 0.5 to 1 by the molar ratio of $NH_3$/transition metal. In a case where the amino acid is used, the concentration is preferably from 0.001 to 0.25, more preferably from 0.005 to 0.1 by the molar ratio of the amino acid/transition metal.

Production of the nickel-manganese composite oxyhydroxide of the present invention is not necessarily carried out in a controlled atmosphere and may be carried out in a usual air atmosphere.

The method for producing the nickel-manganese composite oxyhydroxide may be carried out either by a batch method or by a continuous method. In the case of a batch method, the mixing time is optional. It may, for example, be from 3 to 48 hours, further from 6 to 24 hours. On the other hand, in the case of a continuous method, the average retention time over which the nickel-manganese composite oxyhydroxide particles stay in the reactor is preferably from 1 to 30 hours, more preferably from 3 to 20 hours.

In the method for producing the nickel-manganese composite oxyhydroxide of the present invention, after the nickel-manganese composite oxyhydroxide is precipitated, it is preferred that the obtained slurry is subjected to filtration and the cake is washed and dried.

Washing is carried out so as to remove impurities attached to or adsorbed on the nickel-manganese composite oxyhydroxide. As the washing method, the nickel-manganese composite oxyhydroxide may be added to water (for example, pure water, running water or river water), followed by stirring.

Drying is carried out to remove moisture in the nickel-manganese composite oxyhydroxide. The drying method may be a method of drying the nickel-manganese composite oxyhydroxide at from 110 to 150° C. for from 2 to 15 hours.

Drying is carried out e.g. by a convection heating drying or radiant heating drying apparatus.

In the production method of the present invention, after the nickel-manganese composite oxyhydroxide is washed and dried, it may be pulverized.

Pulverization may be carried out to obtain a powder having an average particle size suitable for the application.

The pulverization conditions are optional so long as the desired average particle size can be obtained, and for example, wet pulverization or dry pulverization may, for example, be mentioned.

The nickel-manganese composite oxyhydroxide of the present invention has high dispersibility of the metal element and may be used for production of the lithium-nickel-manganese composite oxide.

In a case where the lithium-nickel-manganese composite oxide is produced by using the nickel-manganese composite oxyhydroxide of the present invention as a material, its production method preferably comprises a step (mixing step) of mixing the nickel-manganese composite oxyhydroxide with at least one member selected from the group consisting of lithium and a lithium compound and a step (firing step) of subjecting the mixture to heat treatment.

The mixing ratio of the lithium material to the nickel-manganese composite oxyhydroxide used for production of the lithium-nickel-manganese composite oxide of the present invention is preferably from 0.50 to 0.55, more preferably from 0.51 to 0.53 by the lithium/transition metal molar ratio.

Further, mixing may be carried out by dry mixing or wet mixing, however, the method is optional. Dry mixing may, for example, be mixing by a Henschel mixer.

In the mixing step, the lithium compound may be any optional one. The lithium compound may, for example, be preferably at least one member selected from the group consisting of lithium hydroxide, lithium oxide, lithium carbonate, lithium iodide, lithium nitrate, lithium oxalate and an alkyl lithium. As a preferred lithium compound, at least one member selected from the group consisting of lithium hydroxide, lithium oxide and lithium carbonate may, for example, be mentioned.

In the firing step, after the respective materials are mixed, the mixture is fired by a muffle electric furnace or the like to produce the lithium-nickel-manganese composite oxide. Firing may be carried out at a temperature of from 500 to 1,000° C., preferably from 800 to 1,000° C., in an atmosphere such as in the air or in oxygen.

The obtained lithium-nickel-manganese composite oxide may be used as a cathode active material of a lithium secondary battery.

As an anode active material used for the lithium secondary battery of the present invention, a substance capable of absorbing and desorbing lithium metal, lithium or lithium ions may be used. It may, for example, be a lithium/aluminum alloy, a lithium/tin alloy, a lithium/lead alloy or a carbon material capable of electrochemically inserting and releasing lithium ions. Among them, a carbon material capable of electrochemically inserting and releasing lithium ions is particularly suitably used in view of the safety and battery properties.

The electrolyte used for the lithium secondary battery of the present invention is not particularly limited and may, for example, be one having a lithium salt dissolved in an organic solvent such as a carbonate, a sulfolane, a lactone or an ether, or a lithium ion-conductive solid electrolyte may be used. Among them, a carbonate is preferred.

The separator used for the lithium secondary battery of the present invention is not particularly limited, and may, for example, be a fine porous film made of e.g. a polyethylene or a polypropylene may be used.

As an example of the constitution of the lithium secondary battery of the present invention, a battery using as the cathode a formed product obtained in such a manner that a mixture of the lithium-nickel-manganese composite oxide of the present invention with an electrically conductive material is formed into pellets, which are vacuum dried at from 100 to 200° C., preferably from 150 to 200° C., and an anode consisting of a metal lithium foil, and an electrolytic solution having lithium hexafluorophosphate dissolved in a mixed solvent of ethylene carbonate and diethyl carbonate, may be mentioned.

EXAMPLES

Now, the present invention will be described in further detail with reference to Examples. However, it should be understood that the present invention is by no means restricted thereto.

<Measurement of Chemical Composition>

The composition of the composite oxyhydroxide (composite compound) was analyzed by inductively-coupled plasma spectrometry (ICP method). That is, the composite oxyhydroxide was dissolved in a mixed solution of hydrochloric acid and hydrogen peroxide to prepare a measurement solution. The obtained measurement solution was analyzed by an inductively-coupled plasma spectrometer (tradename: OPTIMA3000DV, manufactured by PERKIN ELMER) to determine the chemical composition.

<Measurement of Metal Valence>

The average valence of metals such as nickel and manganese was measured by iodometry. 0.3 g of the composite oxyhydroxide and 3.0 g of potassium iodide were dissolved in 50 ml of 7N-hydrochloric acid solution and neutralized with 200 ml of a 1N-NaOH solution. A 0.1N-aqueous sodium thiosulfate solution was dropwise added to the neutralized sample solution, and the average valence was calculated from the amount added dropwise. As the indicator, a starch solution was used.

<Powder X-Ray Diffraction Measurement>

The powder X-ray diffraction measurement of the sample was carried out using an X-ray diffraction apparatus (tradename: MXP-3, manufactured by MacScience). Measurement was carried out using as the radiation source CuKα rays ($\lambda$=1.5405 Å) with a step scanning as the measurement mode under scanning conditions of 0.04° per second for a measurement time of 3 seconds within a measurement range 2θ of from 5° to 100°.

<Identification of Crystal Phase>

The crystal phase having a hexagonal cadmium hydroxide structure was confirmed by the XRD pattern obtained by XRD measurement under the above conditions having a sharp peak at 2θ=19.0±0.5° and having broad XRD peaks at 36.9±1.5°, 48.0±3.5°, 62.0±5.0° and 65.0±5.0°. Broad peaks other than the lowest angle peak are due to influence of the stacking fault.

<Measurement of Particle Size Distribution and Average Particle Size>

0.5 g of the composite oxyhydroxide was poured into 50 mL of a 0.1N aqueous ammonia solution and irradiated with ultrasonic waves for 10 seconds to prepare a dispersed slurry. The dispersed slurry was charged into a particle size distribution measuring apparatus (tradename: Microtrac HRA, manufactured by Honeywell International Inc.) and the volume distribution was measured by a laser diffraction method. From the obtained volume distribution, the particle size distribution and the average particle size (μm) were obtained.

<Measurement of Tap Density>

2 g of the composite oxyhydroxide was filled in a 10 mL (milliliter) glass measuring cylinder and tapped 200 times. The tap density (g/cm³) was calculated from the weight and the volume after tapping.

<Measurement of Specific Surface Area>

Using a fluid specific surface area automatic measuring apparatus (tradename: FlowSorb 3-2305, manufactured by Micrometerics Instrument Corporation), 1.0 g of the composite oxyhydroxide was pre-treated in a stream of nitrogen at 150° C. for 1 hour, and then the adsorption and desorption area was measured by a BET one point method, and divided by the weight to obtain the specific surface area (m²/g).

<Battery Performance Evaluation>

The lithium-nickel-manganese composite oxide and a mixture (tradename: TAB-2) of polytetrafluoroethylene and acetylene black as an electrically conductive material were mixed in a weight ratio of 4:1 and formed into pellets on a mesh (made of SUS316) under a pressure of 1 ton/cm², which were vacuum dried at 150° C. to prepare a cathode for a battery.

The obtained cathode for a battery, an anode consisting of a metal lithium foil (thickness: 0.2 mm), and an electrolytic solution having lithium hexafluorophosphate dissolved at a concentration of 1 mol/cm³ in a mixed solvent of ethylene carbonate and diethyl carbonate, were used to constitute a lithium secondary battery. The lithium secondary battery was charged and discharged at a constant current between a battery voltage of 4.9 V and 3.0 V at room temperature for 30 cycles. The current density at the time of charge and discharge was 0.4 mA/cm².

Example 1

Nickel sulfate and manganese sulfate were dissolved in pure water to obtain an aqueous solution (aqueous metal salt solution) containing 1.5 mol/L (liter) of nickel sulfate and 0.5 mol/L of manganese sulfate. The total concentration of all the metals in the aqueous metal salt solution was 2.0 mol/L.

Further, 200 g of pure water was put into a reaction container having an internal capacity of 1 L and heated to and maintained at 80° C.

The obtained aqueous metal salt solution was added to the reaction container at a supply rate of 0.28 g/min. Further, as an oxidizing agent, air was bubbled into the reaction container at a supply rate of 1 L/min. When the aqueous metal salt solution and air were supplied, a 2 mol/L aqueous sodium hydroxide solution (aqueous caustic soda solution) was intermittently added to keep a pH of 10 to obtain a mixed aqueous solution. In the mixed aqueous solution, a nickel-manganese composite oxyhydroxide was precipitated, whereby a slurry was obtained. The obtained slurry was subjected to filtration and washed with pure water, and the resulting wet cake was air-dried in the air for one week and then dried at 115° C. for 5 hours to obtain a nickel-manganese composite oxyhydroxide ($Ni_{0.25}Mn_{0.75}OOH$).

In an XRD pattern of the obtained nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault. The results of measurement of the nickel-manganese composite oxyhydroxide are shown in Table 1.

TABLE

| Example | Average particle size (μm) | Specific surface area (m²/g) | Tap density (g/cm³) | Composition (molar ratio) Ni:Mn:M1:M2 | Average valence of metals |
|---|---|---|---|---|---|
| 1 | 6.0 | 43 | 1.2 | 0.25:0.75:0.00:0.00 | 3.0 |
| 2 | 8.3 | 31 | 1.1 | 0.25:0.75:0.00:0.00 | 2.9 |
| 3 | 5.0 | 31 | 1.1 | 0.25:0.75:0.00:0.00 | 2.9 |
| 4 | 10.0 | 17 | 1.5 | 0.24:0.76:0.00:0.00 | 3.0 |
| 5 | 18.5 | 19 | 1.8 | 0.25:0.75:0.00:0.00 | 3.0 |
| 6 | 7.4 | 21 | 1.7 | 0.25:0.75:0.00:0.00 | 3.0 |
| 9 | 15.5 | 22 | 1.9 | 0.23:0.77:0.00:0.00 | 3.0 |
| 10 | 20.0 | 40 | 1.4 | 0.27:0.73:0.00:0.00 | 3.0 |
| 11 | 15.2 | 60 | 1.6 | 0.25:0.75:0.00:0.00 | 3.0 |
| 12 | 18.2 | 32 | 1.6 | 0.25:0.75:0.00:0.00 | 3.0 |
| 13 | 10.9 | 67 | 1.2 | 0.225:0.75:0.025:0.00 | 3.1 |
| 14 | 5.3 | 57 | 0.91 | 0.225:0.725:0.025:0.025 | 3.0 |
| 15 | 6.4 | 68 | 0.95 | 0.225:0.725:0.025:0.025 | 3.1 |
| 16 | 6.0 | 75 | 1.4 | 0.225:0.75:0.025:0.00 | 3.1 |

Example 2

A slurry was obtained in the same manner as in Example 1 except that oxygen was used as an oxidizing agent and a 2 mol/L aqueous sodium hydroxide solution was intermittently added to keep a pH of 8.5. In the same manner as in Example 1, the obtained slurry was subject to filtration and washed, and the resulting wet cake was dried to obtain a nickel-manganese composite oxyhydroxide ($Ni_{0.25}Mn_{0.75}OOH$).

In an XRD pattern of the obtained nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault. The results of measurement of the nickel-manganese composite oxyhydroxide are shown in Table 1.

Example 3

A slurry was obtained in the same manner as in Example 1 except that a 15 wt % aqueous hydrogen peroxide solution (supply rate: 0.34 g/min) was used as the oxidizing agent. In the same manner as in Example 1, the obtained slurry was subjected to filtration and washed, and the resulting wet cake was dried to obtain a nickel-manganese composite oxyhydroxide ($Ni_{0.25}Mn_{0.75}OOH$).

In an XRD pattern of the obtained nickel-manganese composite oxyhydroxide, a sharp peak at 2θ=19.0°, a broad peak at 2θ=40° and more, and the like were confirmed, and thus its crystal structure was confirmed to be a cadmium hydroxide structure having stacking fault. The results of measurement of the nickel-manganese composite oxyhydroxide are shown in Table 1.

Example 4

Nickel sulfate and manganese sulfate were dissolved in pure water to obtain an aqueous solution (aqueous metal salt solution) containing 1.5 mol/L of nickel sulfate and 0.5 mol/L of manganese sulfate (the total concentration of all the metals in the aqueous metal salt solution was 2.0 mol/L).

Further, 200 g of pure water was put into a reaction container having an internal capacity of 1 L and heated to and maintained at 80° C.

The aqueous metal salt solution and a 1.0 mol/L ammonium sulfate solution were continuously added to the reaction container at a supply rate of 0.28 g/min. Further, as an oxidizing agent, air was bubbled into the reaction container at a supply rate of 1 L/min. When the aqueous metal salt solution and air were supplied, a 2 mol/L aqueous sodium hydroxide solution (aqueous caustic soda solution) was intermittently added to keep a pH of 9 to obtain a mixed aqueous solution. In the obtained mixed aqueous solution, a nickel-manganese composite oxyhydroxide was precipitated, and a slurry was obtained. The obtained slurry was subjected to filtration and washed with pure water, and the resulting wet cake was air-dried in the air for one week, and then dried at 115° C. for 5 hours to obtain a nickel-manganese composite oxyhydroxide ($Ni_{0.24}Mn_{0.76}OOH$).

In an XRD pattern of the obtained nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault. The results of measurement of the nickel-manganese composite oxyhydroxide are shown in Table 1.

Example 5

Nickel sulfate and manganese sulfate were dissolved in pure water to obtain an aqueous solution (aqueous metal salt solution) containing 1.5 mol/L (liter) of nickel sulfate and 0.5 mol/L of manganese sulfate (the total concentration of all the metals in the aqueous metal salt solution was 2.0 mol/L).

Further, 200 g of pure water was put into a reaction container having an internal capacity of 1 L and heated to and maintained at 60° C.

The aqueous metal salt solution and a 0.25 mol/L ammonium sulfate solution were continuously added to the reaction container at a supply rate of 0.28 g/min. Further, as an oxidizing agent, air was bubbled into the reaction container at a supply rate of 1 L/min. When the aqueous metal salt solution and air were supplied, a 2 mol/L aqueous sodium hydroxide solution (aqueous caustic soda solution) was continuously added to keep a pH of 9.25 to obtain a mixed aqueous solution. In the obtained mixed aqueous solution, a nickel-manganese composite oxyhydroxide was precipitated, and a slurry was continuously obtained from the lower part of the reaction container. The average retention time was 15 hours. The obtained slurry was subjected to filtration and washed with pure water, and the resulting wet cake was air-dried in the air for one week, and then dried at 115° C. for 5 hours to obtain a nickel-manganese composite oxyhydroxide ($Ni_{0.25}Mn_{0.75}OOH$).

In an XRD pattern of the obtained nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault. The results of measurement of the nickel-manganese composite oxyhydroxide are shown in Table 1.

Example 6

A nickel-manganese composite oxyhydroxide ($Ni_{0.25}Mn_{0.75}OOH$) was obtained in the same manner as in Example 5 except that the pH was 9.0 and the concentration of the ammonium sulfate solution was 0.5 mol/L.

In an XRD pattern of the obtained nickel-manganese composite oxyhydroxide, a very sharp peak at 2θ=19.0°, a broad peak at 2θ=40° and more, and the like were observed, and thus its crystal structure was confirmed to be a cadmium hydroxide structure having stacking fault.

The results of measurement of the nickel-manganese composite oxyhydroxide are shown in Table 1.

It was found from Table 1 that in Examples 1 to 6, a nickel-manganese composite oxyhydroxide having a hexagonal cadmium hydroxide structure and having an average valence of metals close to 3 was obtained. Further, in Examples 1 to 6, it was confirmed by XRD pattern analysis that no manganese oxide ($Mn_3O_4$) formed as a by-product.

Example 7

The nickel-manganese composite oxyhydroxide obtained in Example 4 and lithium carbonate (lithium/transition metal molar ratio: 0.52) were mixed by a Henschel mixer, fired in an air stream at 900° C. for 12 hours and then fired at 700° C. for 48 hours to prepare a lithium-nickel-manganese composite oxide. From the results of chemical composition analysis, the compositional formula is represented as $Li_2NiMn_3O_8$.

Figure 7:
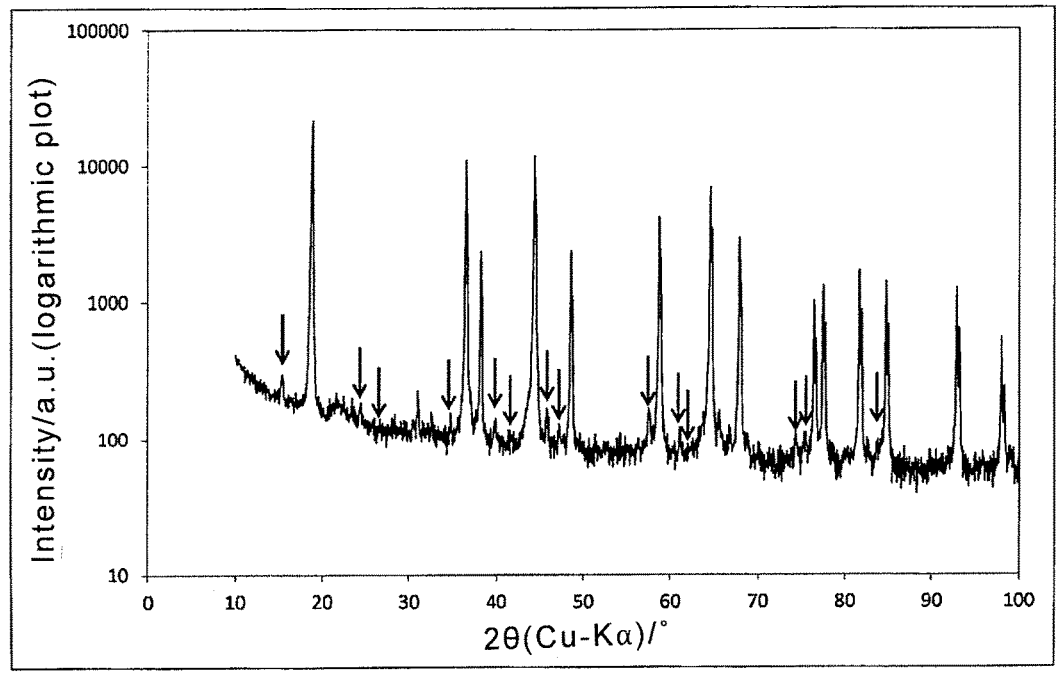
FIG. 7 is an XRD pattern of the lithium-nickel-manganese composite oxide in Example 7 (arrows in the drawing represent superlattice peaks).

Further, in an XRD pattern, superlattice peaks corresponding to the nickel-manganese ordered alignment were clearly observed as indicated by a plurality of arrows in FIG. 7.

Then, the battery performance of the obtained lithium-nickel-manganese composite oxide was evaluated. As a result, it was found from a charge and discharge curve that the potential plateau in the vicinity of 4 V corresponding to Mn4+/3+ oxidation-reduction, was so low as a level of 2 mAh/g, and the capacity in the vicinity of 5 V corresponding to Ni4+/3+ oxidation-reduction would not be impaired. Further, a favorable charge and discharge cycle performance was confirmed since no capacity decrease was observed to the 30th cycle.

Example 8

The nickel-manganese composite oxyhydroxide obtained in Example 6 and lithium carbonate were mixed, fired in an air stream at 800° C. for 10 hours and then fired at 700° C. for 48 hours to prepare a lithium-nickel-manganese composite oxide. From the results of chemical composition analysis, the compositional formula is represented as $Li_2NiMn_3O_8$.

Figure 8:
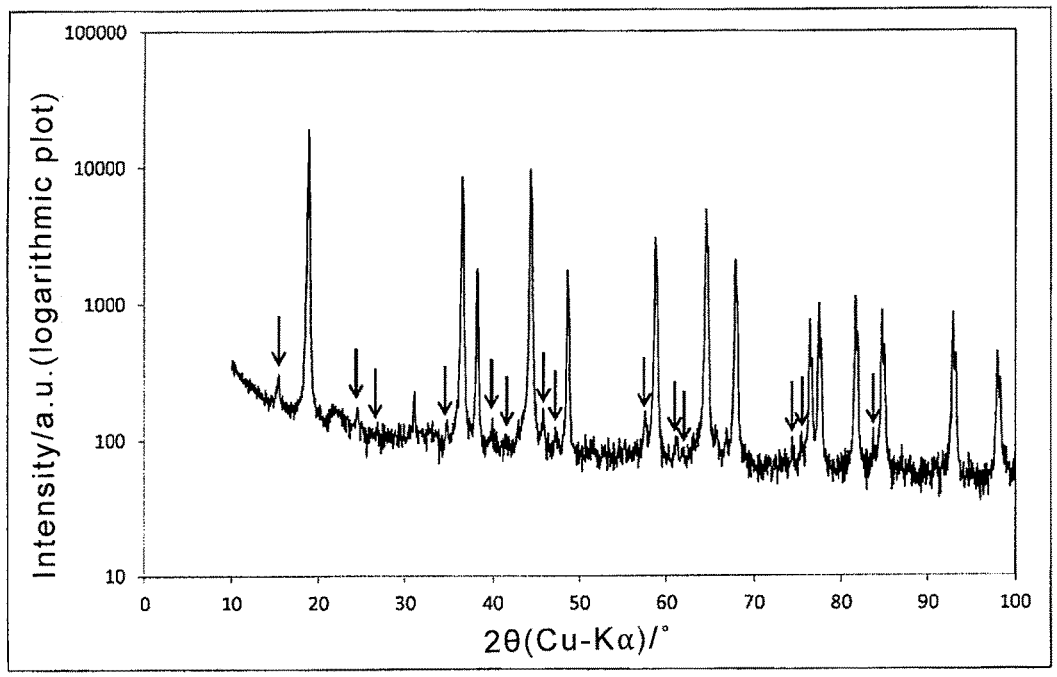
FIG. 8 is an XRD pattern of the lithium-nickel-manganese composite oxide in Example 8 (arrows in the drawing represent superlattice peaks).
Figure 9:
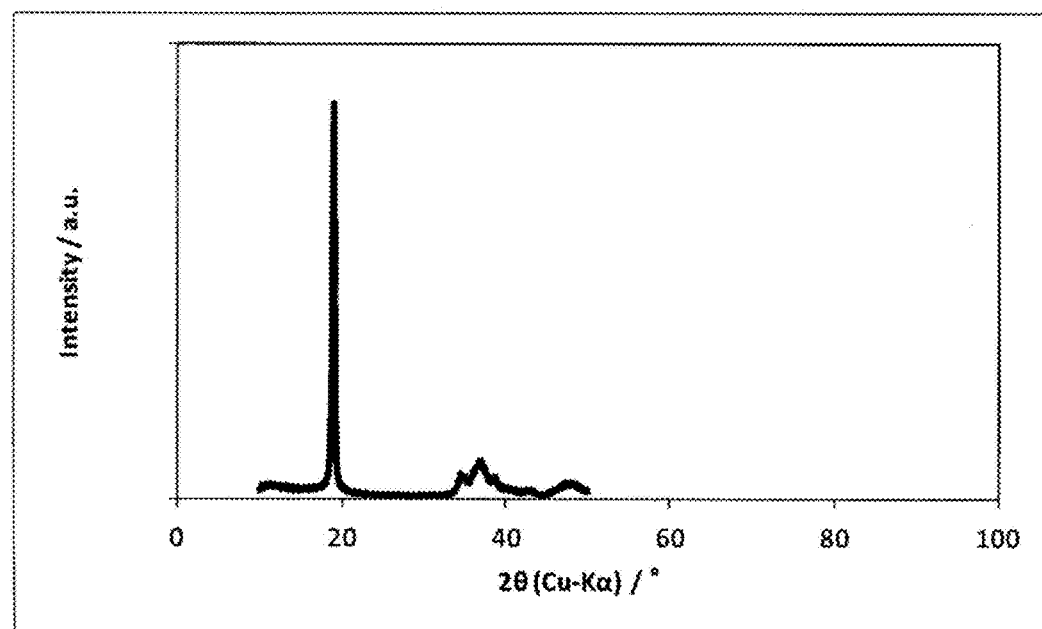
FIG. 9 is an XRD pattern of the nickel-manganese composite oxyhydroxide in Example 9.
Figure 10:
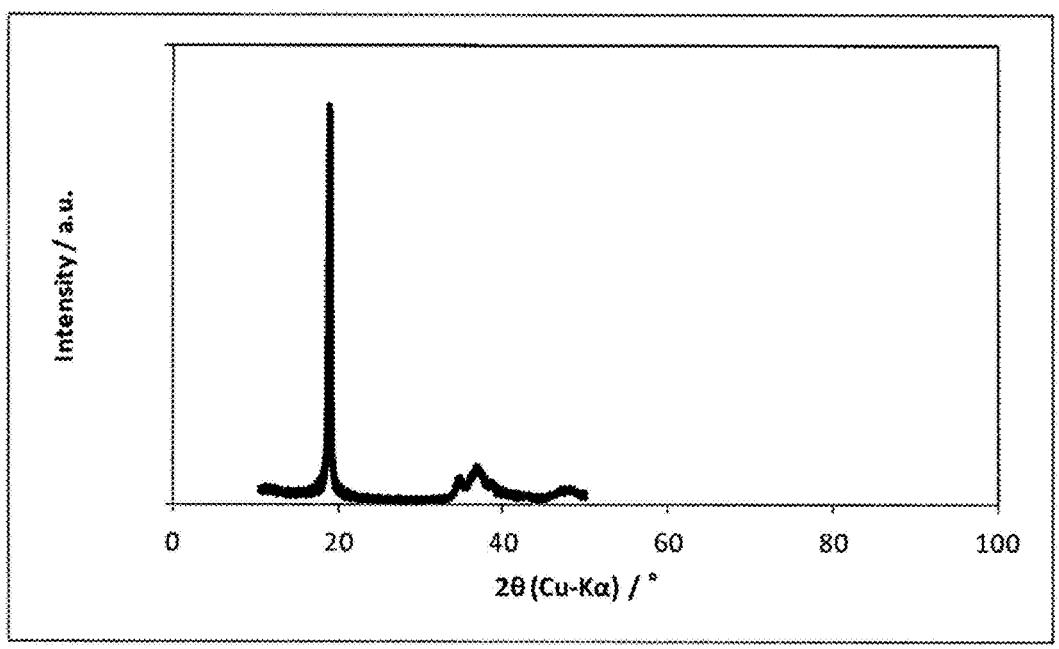
FIG. 10 is an XRD pattern of the nickel-manganese composite oxyhydroxide in Example 10.
Figure 11:
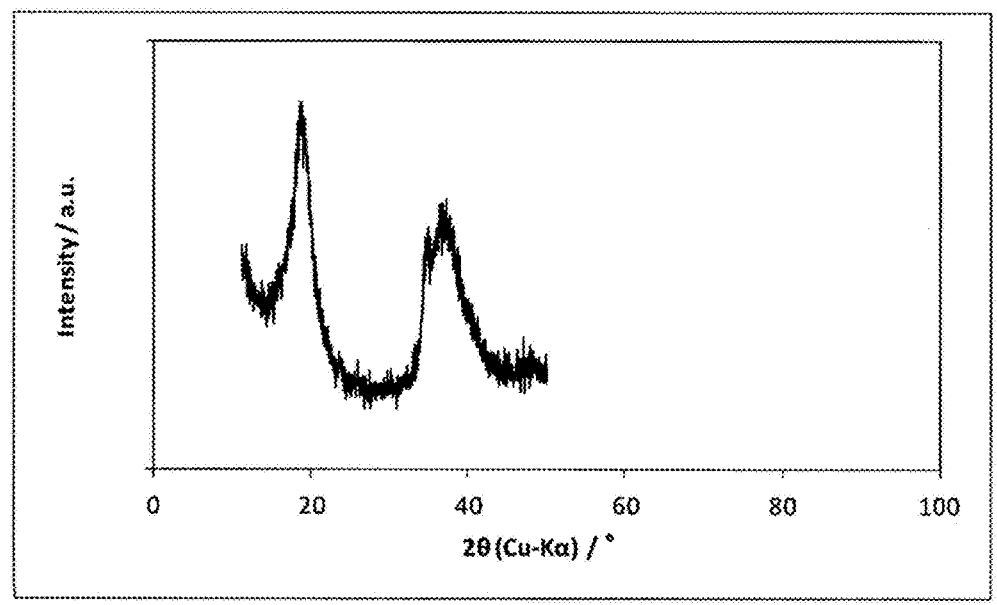
FIG. 11 is an XRD pattern of the nickel-manganese composite oxyhydroxide in Example 11.
Figure 12:
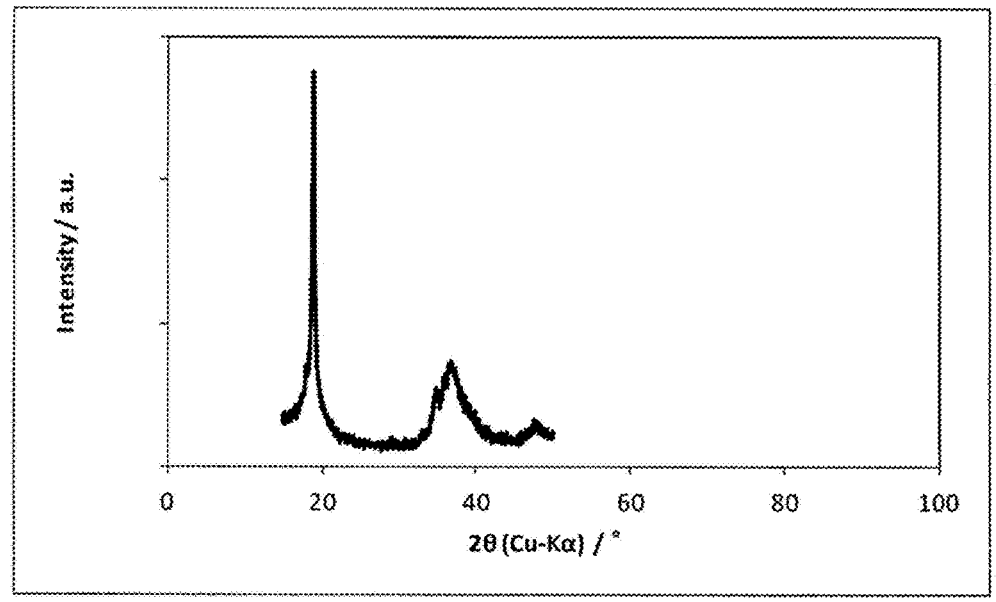
FIG. 12 is an XRD pattern of the nickel-manganese composite oxyhydroxide in Example 12.
Figure 13:
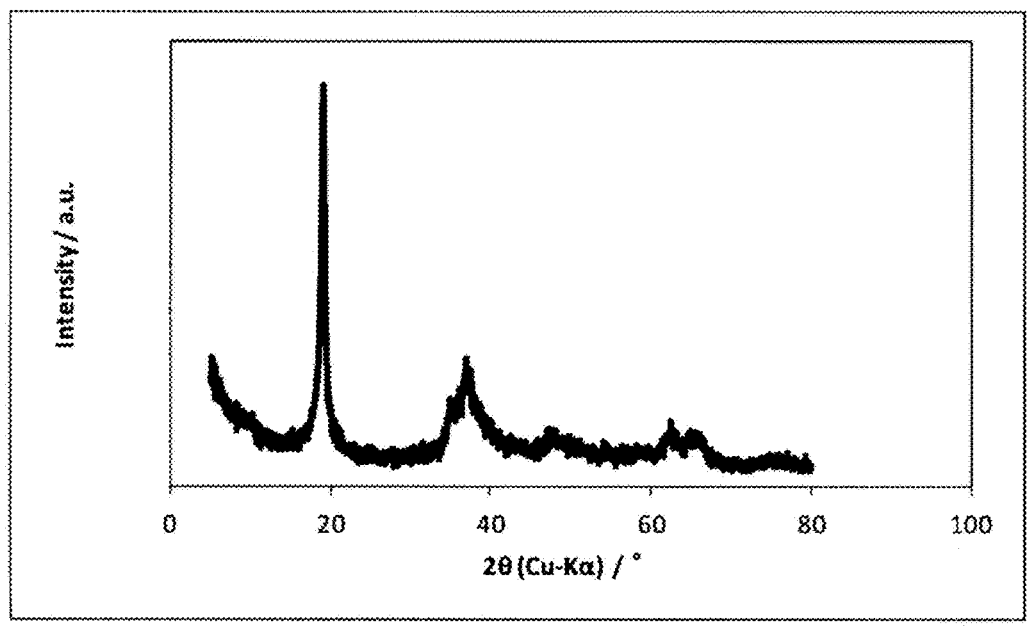
FIG. 13 is an XRD pattern of the magnesium-substituted nickel-manganese composite oxyhydroxide in Example 13.
Figure 14:
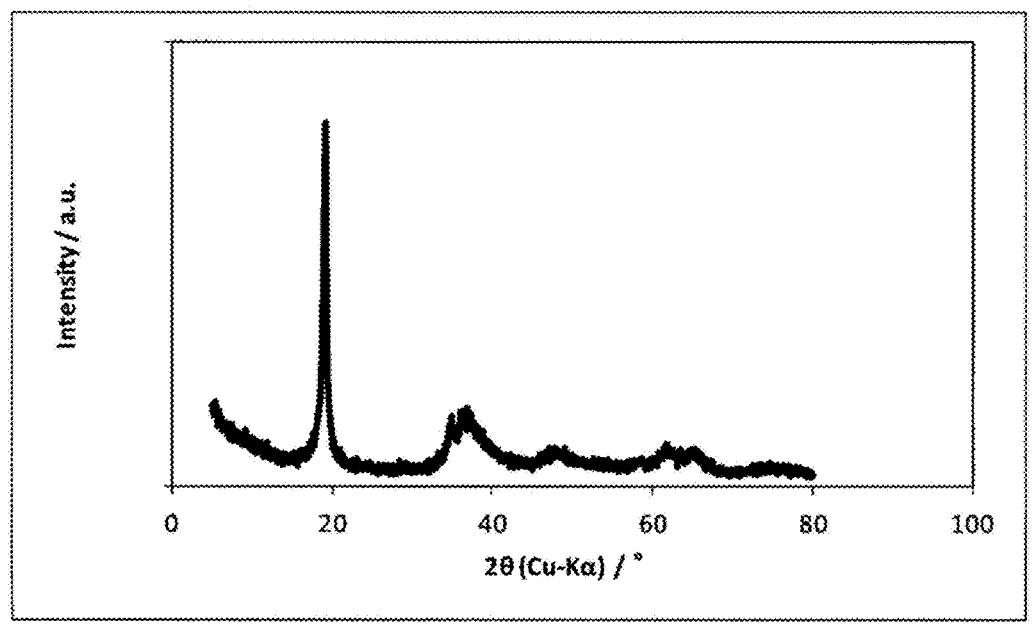
FIG. 14 is an XRD pattern of the iron-substituted nickel-manganese composite oxyhydroxide in Example 14.
Figure 15:
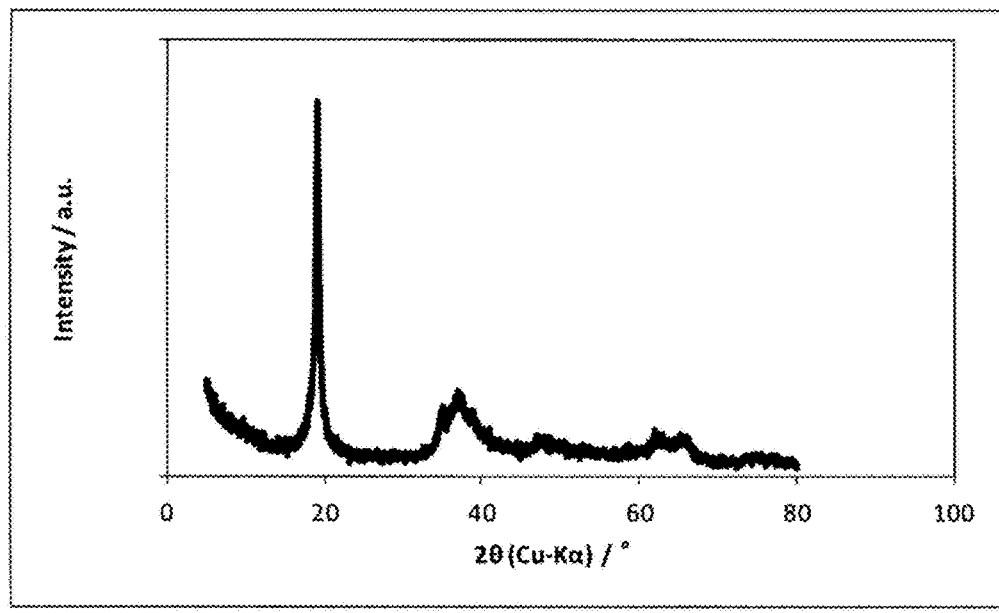
FIG. 15 is an XRD pattern of the cobalt-substituted nickel-manganese composite oxyhydroxide in Example 15.
Figure 16:
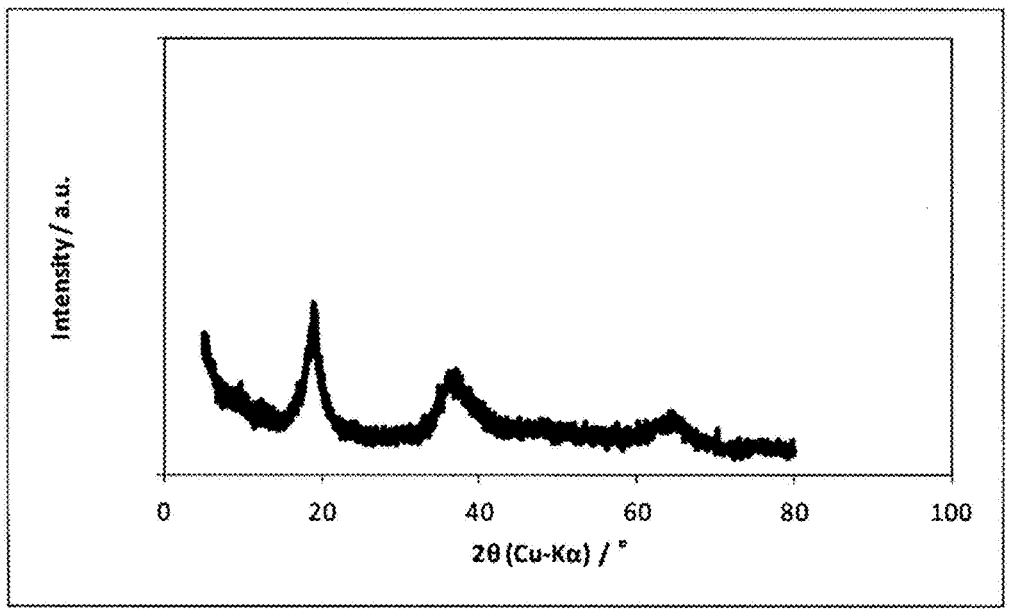
FIG. 16 is an XRD pattern of the copper-substituted nickel-manganese composite oxyhydroxide in Example 16.
Figure 17:
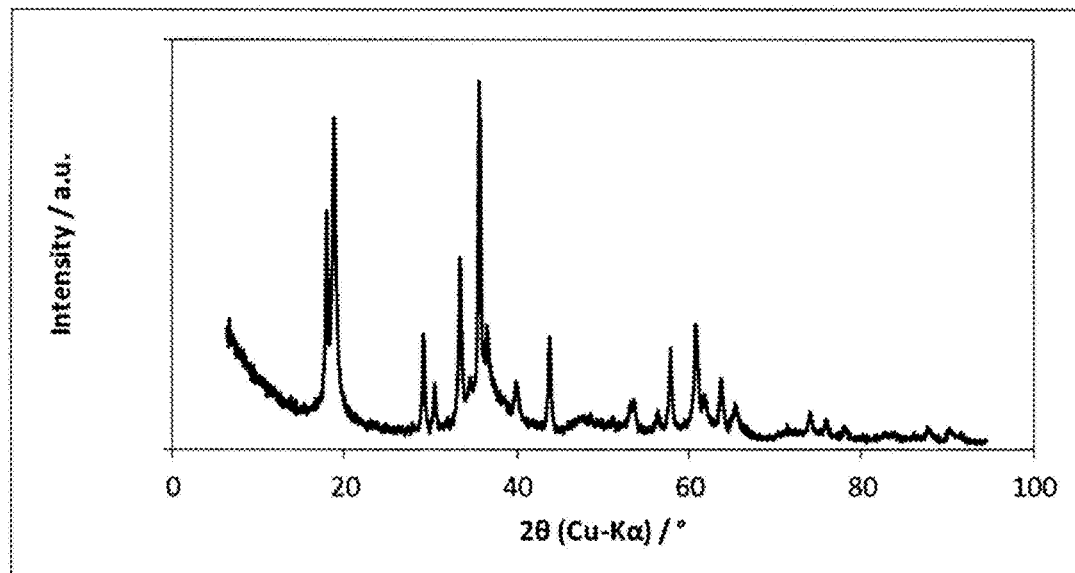
FIG. 17 is an XRD pattern of the nickel-manganese composite compound in Comparative Example 1.
Figure 18:
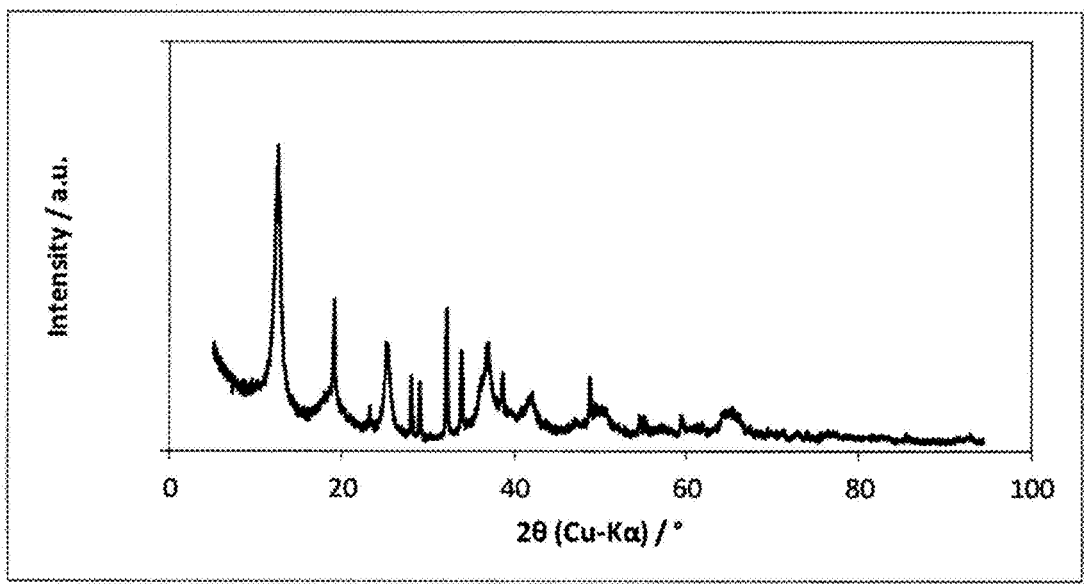
FIG. 18 is an XRD pattern of the nickel-manganese composite compound in Comparative Example 2.
Figure 19:
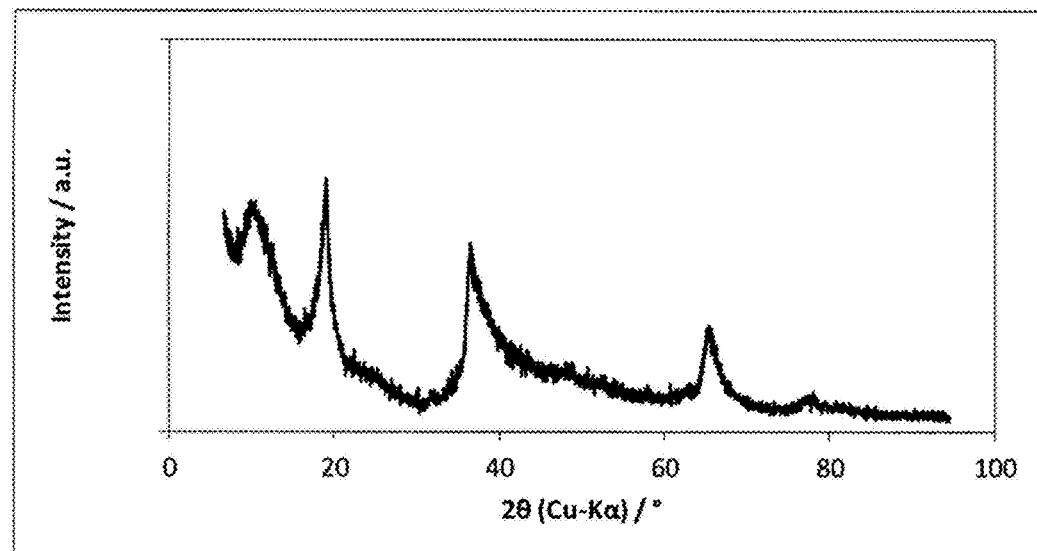
FIG. 19 is an XRD pattern of the nickel-manganese composite compound in Comparative Example 3.
Figure 20:
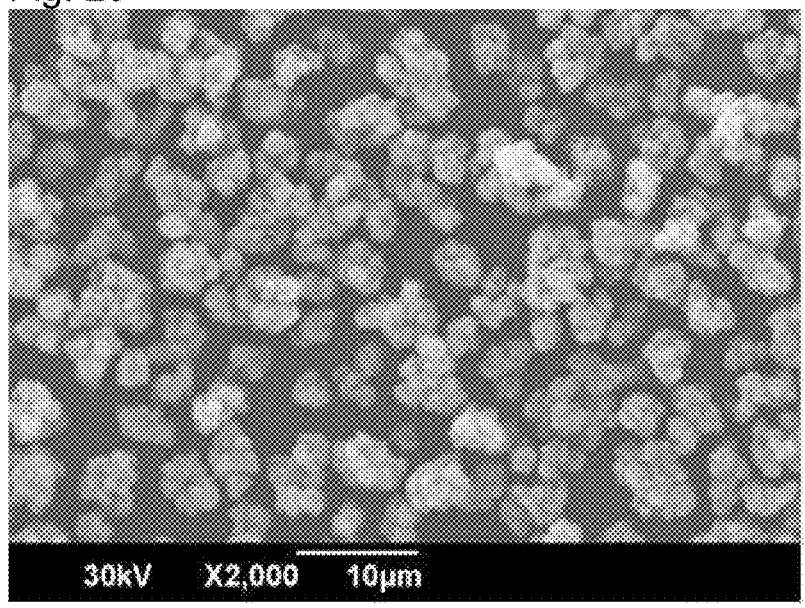
FIG. 20 is a scanning electron microphotograph of the nickel-manganese composite oxyhydroxide in Example 1.
Figure 21:
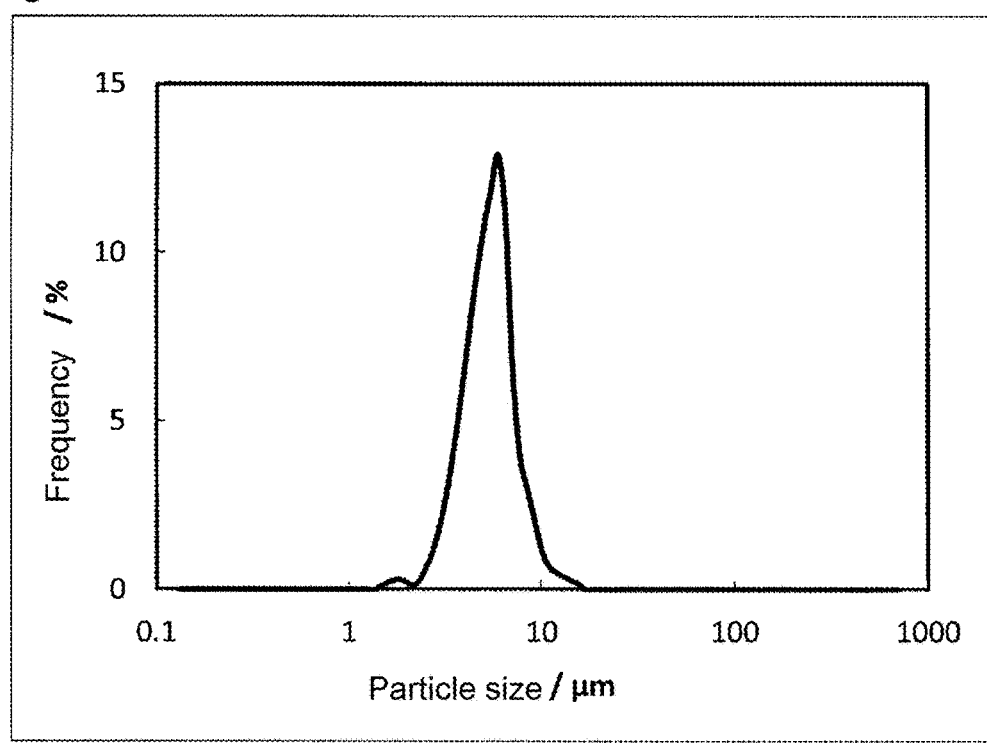
FIG. 21 is a particle size distribution curve of the nickel-manganese composite oxyhydroxide in Example 1.
Figure 22:
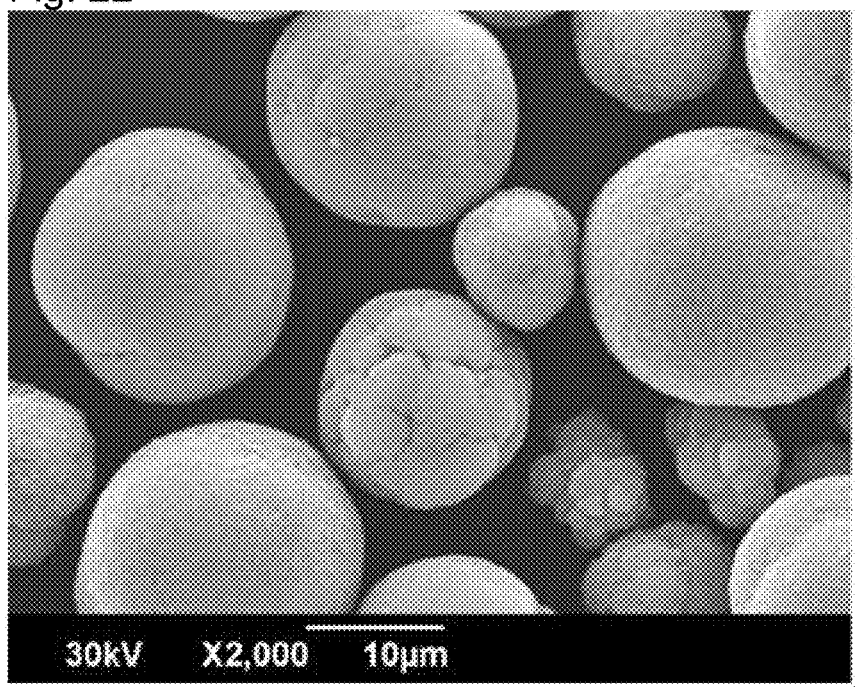
FIG. 22 is a scanning electron microphotograph of the nickel-manganese composite oxyhydroxide in Example 5.
Figure 23:
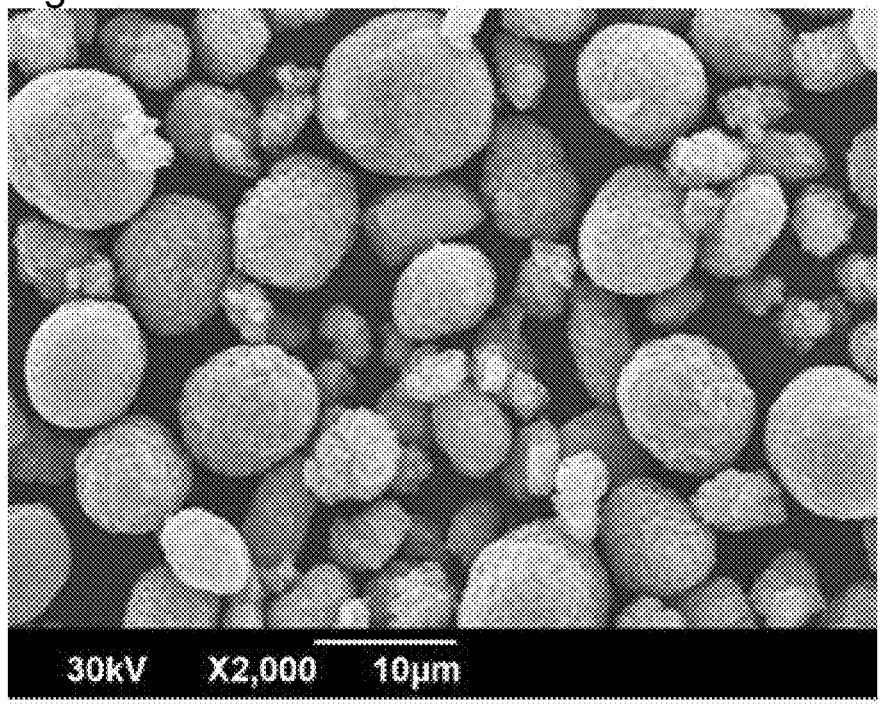
FIG. 23 is a scanning electron microphotograph of the nickel-manganese composite oxyhydroxide in Example 6.
Figure 24:
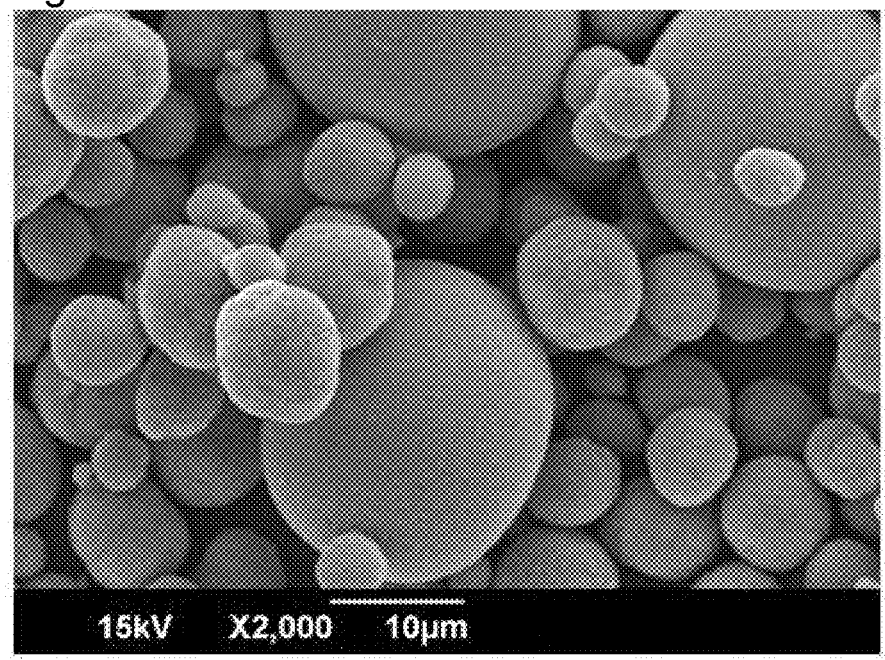
FIG. 24 is a scanning electron microphotograph of the nickel-manganese composite oxyhydroxide in Example 11.
Figure 25:
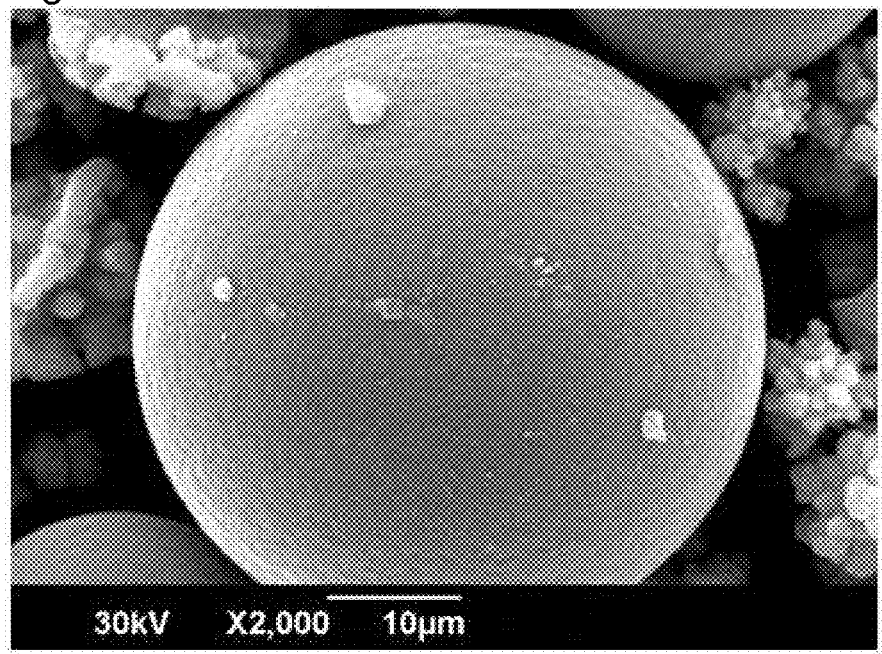
FIG. 25 is a scanning electron microphotograph of the nickel-manganese composite oxyhydroxide in Example 12.
Figure 26:
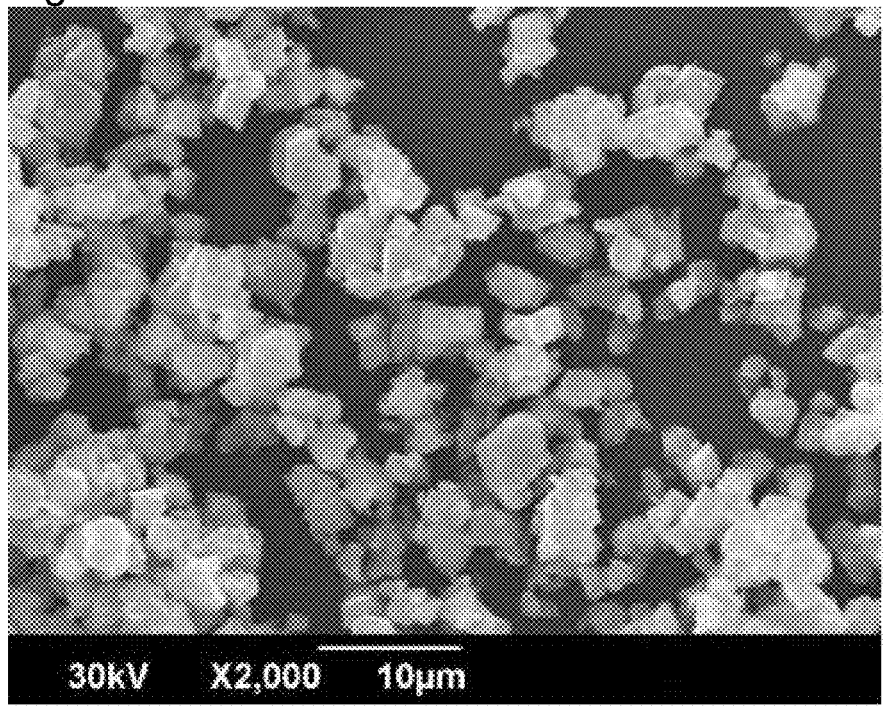
FIG. 26 is a scanning electron microphotograph of the lithium-nickel-manganese composite oxide in Example 7.
Figure 27:
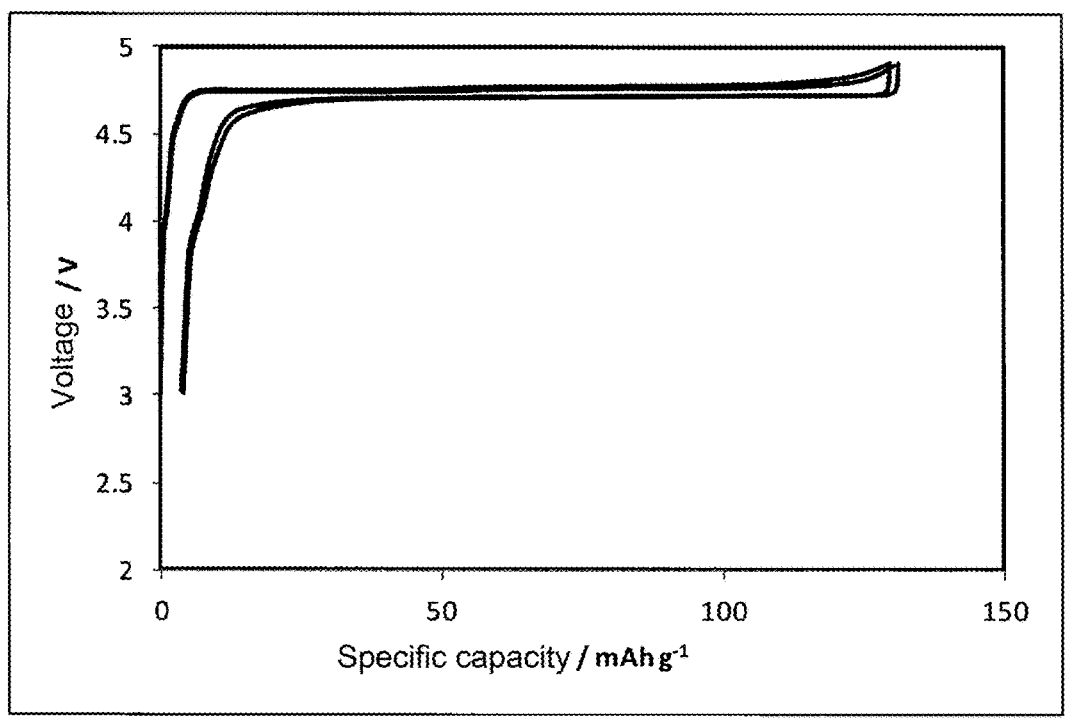
FIG. 27 is a charge and discharge curve (2 to 4 cycles) of the lithium-nickel-manganese composite oxide in Example 7.
Figure 28:
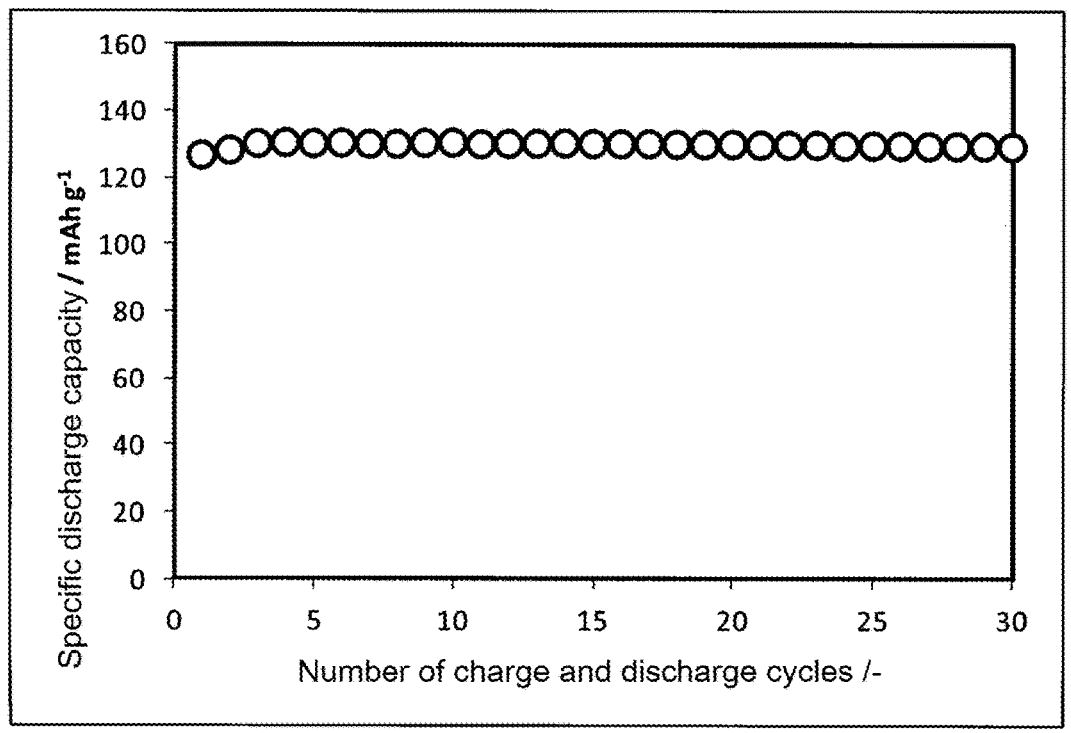
FIG. 28 is a diagram illustrating the charge and discharge cycle performance in Example 7 (1 to 30 cycles).
Figure 29:
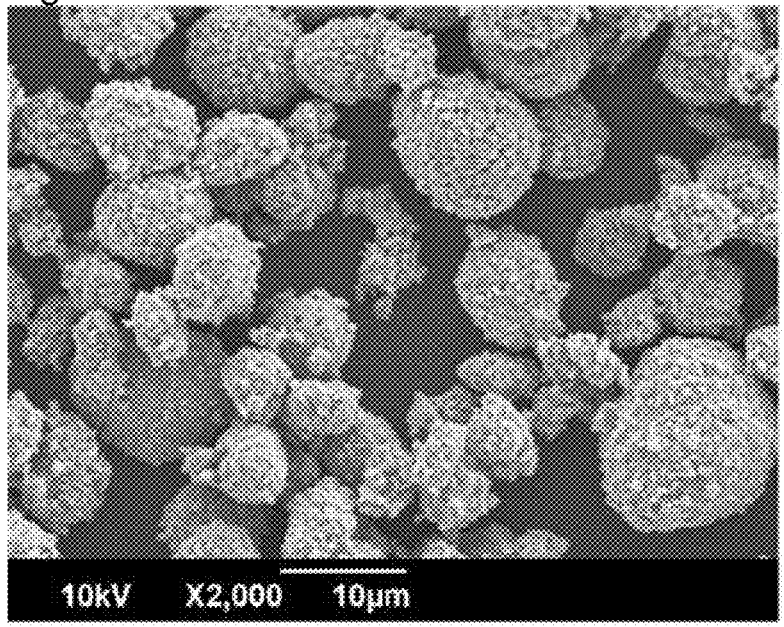
FIG. 29 is a scanning electron microphotograph of the lithium-nickel-manganese composite oxide in Example 8.
Figure 30:
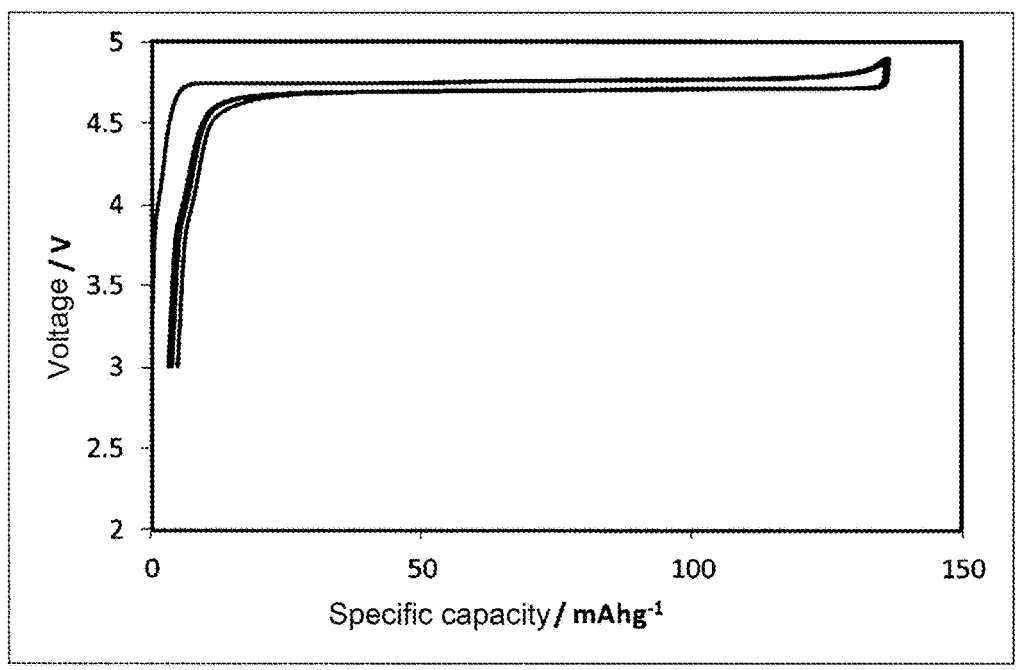
FIG. 30 is a charge and discharge curve (2 to 4 cycles) of the lithium-nickel-manganese composite oxide in Example 8.
Figure 31:
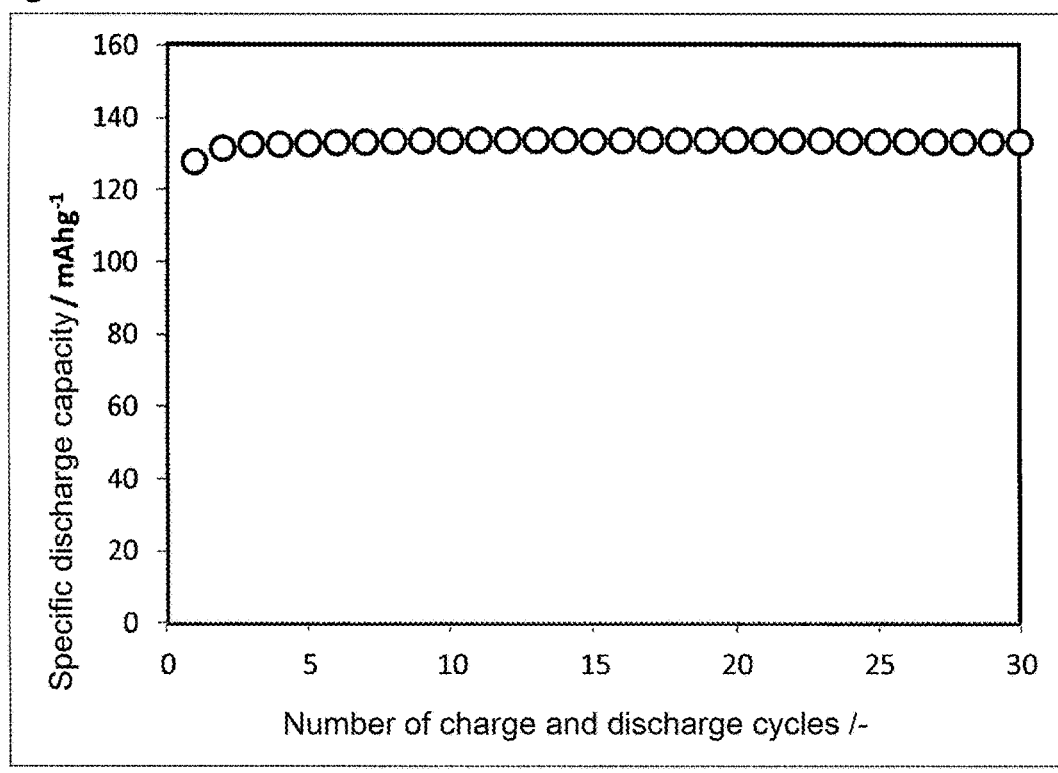
FIG. 31 is a diagram illustrating the charge and discharge cycle performance in Example 8 (1 to 30 cycles).

Further, in an XRD pattern, superlattice peaks corresponding to the nickel-manganese ordered alignment were clearly observed as indicated by a plurality of arrows in FIG. 8.

Then, the battery performance of the obtained lithium-nickel-manganese composite oxide was evaluated. As a result, it was found from a charge and discharge curve that the potential plateau in the vicinity of 4 V corresponding to Mn4+/3+ oxidation-reduction, was so low as a level of 2 mAh/g, and the capacity in the vicinity of 5 V corresponding to Ni4+/3+ oxidation-reduction would not be impaired. Further, a favorable charge and discharge cycle performance was confirmed since no capacity decrease was observed to the 30th cycle.

Example 9

Nickel sulfate and manganese sulfate were dissolved in pure water to obtain an aqueous solution (aqueous metal salt solution) containing 0.46 mol/L of nickel sulfate and 1.54 mol/L of manganese sulfate (the total concentration of all the metals in the aqueous metal salt solution was 2.0 mol/L).

A nickel-manganese composite oxyhydroxide ($Ni_{0.23}Mn_{0.77}OOH$) was obtained in the same manner as in Example 5 except for the above change of the composition of the metal salts.

In an XRD pattern of the obtained nickel-manganese composite oxyhydroxide, a sharp peak at $2\theta=19.0°$, a broad peak at $2\theta=40°$ and more, and the like were observed, and thus its crystal structure was confirmed to be a cadmium hydroxide structure having stacking fault. The results of measurement of the nickel-manganese composite oxyhydroxide are shown in Table 1.

Example 10

Nickel sulfate and manganese sulfate were dissolved in pure water to obtain an aqueous solution (aqueous metal salt solution) containing 0.54 mol/L of nickel sulfate and 1.46 mol/L of manganese sulfate (the total concentration of all the metals in the aqueous metal salt solution was 2.0 mol/L).

A nickel-manganese composite oxyhydroxide ($Ni_{0.27}Mn_{0.73}OOH$) was obtained in the same manner as in Example 5 except for the above change of the composition of the metal salts.

In an XRD pattern of the obtained nickel-manganese composite oxyhydroxide, a sharp peak at $2\theta=19.0°$, a broad peak at $2\theta=40°$ and more, and the like were observed, and thus its crystal structure was confirmed to be a cadmium hydroxide structure having stacking fault. The results of measurement of the nickel-manganese composite oxyhydroxide are shown in Table 1.

Example 11

Nickel sulfate and manganese sulfate were dissolved in pure water to obtain an aqueous solution (aqueous metal salt solution) containing 1.5 mol/L of nickel sulfate and 0.5 mol/L of manganese sulfate (the total concentration of all the metals in the aqueous metal salt solution was 2.0 mol/L).

Further, 200 g of pure water was put into a reaction container having an internal capacity of 1 L and heated to and maintained at 60° C.

The aqueous metal salt solution and a 0.1 mol/L glycine solution were continuously added to the reaction container at a supply rate of 0.28 g/min. Further, as an oxidizing agent, air was bubbled into the reaction container at a supply rate of 1 L/min. When the aqueous metal salt solution and air were supplied, a 2 mol/L aqueous sodium hydroxide solution (aqueous caustic soda solution) was continuously added to keep a pH of 8.75 to obtain a mixed aqueous solution. In the obtained mixed aqueous solution, a nickel-manganese composite oxyhydroxide was precipitated, and a slurry was continuously obtained from the lower part of the reaction container. The average retention time was 15 hours. The obtained slurry was subjected to filtration and washed with pure water, and the resulting wet cake was air-dried in the air for one week, and then dried at 115° C. for 5 hours to obtain a nickel-manganese composite oxyhydroxide ($Ni_{0.25}Mn_{0.75}OOH$).

In an XRD pattern of the obtained nickel-manganese composite oxyhydroxide, a sharp peak at $2\theta=19.0°$, a broad peak at $2\theta=40°$ and more, and the like were observed, and thus its crystal structure was confirmed to be a cadmium hydroxide structure having stacking fault. The results of measurement of the nickel-manganese composite oxyhydroxide are shown in Table 1.

Example 12

Nickel sulfate and manganese sulfate were dissolved in pure water to obtain an aqueous solution (aqueous metal salt solution) containing 1.5 mol/L of nickel sulfate and 0.5 mol/L of manganese sulfate (the total concentration of all the metals in the aqueous metal salt solution was 2.0 mol/L).

Further, 200 g of pure water was put into a reaction container having an internal capacity of 1 L and heated to and maintained at 70° C.

The aqueous metal salt solution and a 0.01 mol/L glycine solution were continuously added to the reaction container at a supply rate of 0.28 g/min. Further, as an oxidizing agent, air was bubbled into the reaction container at a supply rate of 1 L/min. When the aqueous metal salt solution and air were supplied, a 2 mol/L aqueous sodium hydroxide solution (aqueous caustic soda solution) was continuously added to keep a pH of 9.25 to obtain a mixed aqueous solution. In the obtained mixed aqueous solution, a nickel-manganese composite oxyhydroxide was precipitated, and a slurry was continuously obtained from the lower part of the reaction container. The average retention time was 15 hours. The obtained slurry was subjected to filtration and washed with pure water, and the resulting wet cake was air-dried in the air for one week, and then dried at 115° C. for 5 hours to obtain a nickel-manganese composite oxyhydroxide ($Ni_{0.25}Mn_{0.75}OOH$).

In an XRD pattern of the obtained nickel-manganese composite oxyhydroxide, a sharp peak at $2\theta=19.0°$, a broad peak at $2\theta=40°$ and more, and the like were observed, and thus its crystal structure was confirmed to be a cadmium hydroxide structure having stacking fault. The results of measurement of the nickel-manganese composite oxyhydroxide are shown in Table 1.

Example 13

Magnesium sulfate, nickel sulfate and manganese sulfate were dissolved in pure water to obtain an aqueous solution (aqueous metal salt solution) containing 0.05 mol/L of magnesium sulfate, 0.45 mol/L of nickel sulfate and 1.5 mol/L of manganese sulfate (the total concentration of all the metals in the aqueous metal salt solution was 2.0 mol/L).

Further, 200 g of pure water was put into a reaction container having an internal capacity of 1 L, and heated to and maintained at 80° C.

Then, the obtained aqueous metal salt solution and a 0.25 mol/L ammonium sulfate solution were added to the reaction container at a supply rate of 0.28 g/min. Further, as an oxidizing agent, air was bubbled into the reaction container at a supply rate of 1 L/min. When the aqueous metal salt solution and air were supplied, a 2 mol/L aqueous sodium hydroxide solution (aqueous caustic soda solution) was intermittently added to keep a pH of 9.25 to obtain a mixed aqueous solution. In the mixed aqueous solution, a nickel-manganese composite oxyhydroxide was precipitated, and a slurry was obtained. The obtained slurry was subjected to filtration and washed with pure water, and the resulting wet cake was air-dried in the air for one week, and then dried at 115° C. for 5 hours to obtain a magnesium-substituted nickel-manganese composite oxyhydroxide ($Ni_{0.225}Mg_{0.025}Mn_{0.75}OOH$).

In an XRD pattern of the obtained magnesium-substituted nickel-manganese composite oxyhydroxide, a sharp peak at $2\theta=19.0°$, a broad peak at $2\theta=40°$ and more, and the like were observed, and thus its crystal structure was confirmed to be a cadmium hydroxide structure having stacking fault.

The results of measurement of the magnesium-substituted nickel-manganese composite oxyhydroxide are shown in Table 1.

Example 14

An iron-substituted nickel-manganese composite oxyhydroxide [Ni$_{0.225}$Fe$_{0.05}$Mn$_{0.725}$OOH (Ni$_{0.225}$Fe$_{0.025}$Mn$_{0.725}$Fe$_{0.025}$OOH)] was obtained in the same manner as in Example 13 except that iron sulfate, nickel sulfate and manganese sulfate were dissolved in pure water to prepare an aqueous solution (aqueous metal salt solution) containing 0.10 mol/L of iron sulfate, 0.45 mol/L nickel sulfate and 1.45 mol/L of manganese sulfate (the total concentration of all the metals in the aqueous metal salt solution was 2.0 mol/L).

In an XRD pattern of the obtained iron-substituted nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault.

The results of measurement of the iron-substituted nickel-manganese composite oxyhydroxide are shown in Table 1.

Example 15

A cobalt-substituted nickel-manganese composite oxyhydroxide [Ni$_{0.225}$Co$_{0.05}$Mn$_{0.725}$OOH (Ni$_{0.225}$Co$_{0.025}$Mn$_{0.725}$Co$_{0.025}$OOH)] was obtained in the same manner as in Example 13 except that cobalt sulfate, nickel sulfate and manganese sulfate were dissolved in pure water to prepare an aqueous solution (aqueous metal salt solution) containing 0.10 mol/L of cobalt sulfate, 0.45 mol/L nickel sulfate and 1.45 mol/L of manganese sulfate (the total concentration of all the metals in the aqueous metal salt solution was 2.0 mol/L).

In an XRD pattern of the obtained cobalt-substituted nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault.

The results of measurement of the cobalt-substituted nickel-manganese composite oxyhydroxide are shown in Table 1.

Example 16

A copper-substituted nickel-manganese composite oxyhydroxide (Ni$_{0.225}$Cu$_{0.025}$Mn$_{0.75}$OOH) was obtained in the same manner as in Example 13 except that copper sulfate, nickel sulfate and manganese sulfate were dissolved in pure water to prepare an aqueous solution (aqueous metal salt solution) containing 0.05 mol/L of copper sulfate, 0.45 mol/L nickel sulfate and 1.5 mol/L of manganese sulfate (the total concentration of all the metals in the aqueous metal salt solution was 2.0 mol/L).

In an XRD pattern of the obtained copper-substituted nickel-manganese composite oxyhydroxide, a sharp peak at 2θ=19.0°, a broad peak at 2θ=40° and more, and the like were observed, and thus its crystal structure was confirmed to be a cadmium hydroxide structure having stacking fault.

The results of measurement of the copper-substituted nickel-manganese composite oxyhydroxide are shown in Table 1.

It was found from Table 1 that in Examples 9 to 14, a nickel-manganese composite oxyhydroxide or a specific metal-substituted nickel-manganese composite oxyhydroxide having a hexagonal cadmium hydroxide structure and having an average valence of metals close to 3 was obtained.

Further, in Examples 9 to 14, it was confirmed by XRD pattern analysis that no manganese oxide (Mn$_3$O$_4$) formed as a by-product.

Comparative Example 1

A slurry was obtained in the same manner as in Example 2 except that the pH was 7.

In the same manner as in Example 2, the obtained slurry was subjected to filtration and washed, and the resulting wet cake was dried to obtain a nickel-manganese composite compound.

The obtained nickel-manganese composite compound was found to be in a mixed phase of a spinel oxide and an α-Ni(OH)$_2$ type hydroxide by its XRD pattern. The results of measurement of the nickel-manganese composite compound are shown in Table 2.

TABLE 2

| Comparative Example | Average particle size (μm) | Composition (molar ratio) Ni:Mn:M1:M2 | Average valence of metals |
|---|---|---|---|
| 1 | 2.5 | 0.25:0.75:0.00:0.00 | 2.6 |
| 2 | 2.8 | 0.25:0.75:0.00:0.00 | 3.0 |
| 3 | 11 | 0.25:0.75:0.00:0.00 | 3.3 |

Comparative Example 2

A slurry was obtained in the same manner as in Example 1 except that the pH was 11.

In the same manner as in Example 1, the obtained slurry was subjected to filtration and washed, and the resulting wet cake was dried to obtain a nickel-manganese composite compound.

The obtained nickel-manganese composite compound was found to be in a mixed phase of a cadmium hydroxide type oxyhydroxide and a spinel oxide from its XRD pattern. The results of measurement of the nickel-manganese composite compound are shown in Table 2.

Comparative Example 3

A slurry was obtained in the same manner as in Example 1 except that a 30 wt % aqueous sodium persulfate solution (supply rate: 0.28 g/min) was used as the oxidizing agent.

In the same manner as in Example 1, the obtained slurry was subjected to filtration and washed, and the resulting wet cake was dried to obtain a nickel-manganese composite compound.

In an XRD pattern of the obtained nickel-manganese composite compound, peak positions are different from those of a cadmium hydroxide type oxyhydroxide, and all the peaks are broad patterns considered to be peaks of a layered compound.

The results of measurement of the nickel-manganese composite compound are shown in Table 2.

As evident from Table 2, no single crystal phase of an oxyhydroxide having a cadmium hydroxide structure could be obtained by a reaction using an oxygen-containing gas at a pH of 7 or 11 or by a reaction using as the oxidizing agent sodium persulfate, not an oxygen-containing gas or hydrogen peroxide.

INDUSTRIAL APPLICABILITY

The nickel-manganese composite oxyhydroxide of the present invention may be used as a precursor of a lithiumnickel-manganese composite oxide used for e.g. a cathode active material of a lithium secondary battery, and the lithium-nickel-manganese composite oxide may be used as a cathode material for a battery to constitute a high performance lithium secondary battery.

The entire disclosures of Japanese Patent Application No. 2013-149435 filed on Jul. 18, 2013 and Japanese Patent Application No. 2013-249314 filed on Dec. 2, 2013 including specifications, claims, drawings and summaries are incorporated herein by reference in their entireties.

The invention claimed is:

1. A nickel-manganese composite oxyhydroxide having a chemical compositional formula represented by $Ni_{(0.25+\alpha)-x}M1_xMn_{(0.75-\alpha)-y}M2_yOOH$ wherein each of M1 and M2 which are independent of each other, is at least one member selected from the group consisting of Mg, Al, Ti, V, Cr, Fe, Co, Cu, Zn and Zr, $0 \leq x \leq 0.1$, $0 \leq y \leq 0.25$, and $-0.025 \leq \alpha \leq 0.025$, and having a hexagonal cadmium hydroxide type crystal structure.

2. The nickel-manganese composite oxyhydroxide according to claim 1, wherein $\alpha$ is 0.

3. The nickel-manganese composite oxyhydroxide according to claim 1, wherein the average valence of Ni, Mn, M1 and M2 is from 2.8 to 3.1.

4. The nickel-manganese composite oxyhydroxide according to claim 1, which has an average particle size of from 5 to 20 µm.

5. A method for producing the nickel-manganese composite oxyhydroxide as defined in claim 1, which comprises mixing the following aqueous metal salt solution, an aqueous caustic soda solution and the following oxidizing agent at a pH of from 8.5 to 10 to obtain a mixed aqueous solution and precipitating the nickel-manganese composite oxyhydroxide in the mixed aqueous solution:

aqueous metal salt solution: an aqueous metal salt solution containing nickel and manganese or an aqueous metal salt solution containing nickel and manganese and further containing at least one member selected from the group consisting of Mg, Al, Ti, V, Cr, Fe, Co, Cu, Zn and Zr;

oxidizing agent: an oxygen-containing gas or an aqueous hydrogen peroxide solution.

6. The production method according to claim 5, wherein a complexing agent is further added.

7. The production method according to claim 6, wherein the complexing agent is ammonia, an ammonium salt or an amino acid.

* * * * *